(12) United States Patent
Yokoyama et al.

(10) Patent No.: US 7,654,595 B2
(45) Date of Patent: Feb. 2, 2010

(54) ARTICULATED DRIVING MECHANISM, METHOD OF MANUFACTURING THE MECHANISM, AND HOLDING HAND AND ROBOT USING THE MECHANISM

(75) Inventors: Kazuo Yokoyama, Hirakata (JP); Atsushi Ono, Kyoto (JP); Katsuhiko Asai, Nara (JP); Yuji Adachi, Hirakata (JP); Masaki Yamamoto, Nara (JP)

(73) Assignee: Panasonic Corporation, Osaka (JP)

( * ) Notice: Subject to any disclaimer, the term of this patent is extended or adjusted under 35 U.S.C. 154(b) by 266 days.

(21) Appl. No.: 10/518,756

(22) PCT Filed: Jun. 23, 2003

(86) PCT No.: PCT/JP03/07914

§ 371 (c)(1),
(2), (4) Date: Dec. 21, 2004

(87) PCT Pub. No.: WO04/000508

PCT Pub. Date: Dec. 31, 2003

(65) Prior Publication Data

US 2005/0218679 A1 Oct. 6, 2005

(30) Foreign Application Priority Data

Jun. 24, 2002 (JP) ............................. 2002-182504

(51) Int. Cl.
*B25J 15/12* (2006.01)
(52) U.S. Cl. .................... 294/99.1; 294/119.3
(58) Field of Classification Search ................ 294/99.1, 294/106, 119.3, 86.4; 901/39, 111, 119.3; 623/64

See application file for complete search history.

(56) References Cited

U.S. PATENT DOCUMENTS

| | | | | | |
|---|---|---|---|---|---|
| 2,435,614 | A | * | 2/1948 | Tureman, Jr. | ................ 623/64 |
| 3,509,583 | A | * | 5/1970 | Fraioli | .......................... 901/33 |
| 4,350,381 | A | * | 9/1982 | Hellmann | ................. 294/119.3 |
| 4,364,593 | A | * | 12/1982 | Maeda | ...................... 294/106 |
| 4,928,926 | A | * | 5/1990 | Bloemendal et al. | ....... 254/93 R |
| 5,130,747 | A | | 7/1992 | Kikuiri et al. | |
| 5,200,679 | A | * | 4/1993 | Graham | ...................... 294/907 |
| 5,245,885 | A | * | 9/1993 | Robertson | ................ 294/119.3 |

FOREIGN PATENT DOCUMENTS

| | | |
|---|---|---|
| EP | 0 333 872 | 9/1989 |
| EP | 1 043 642 | 10/2000 |
| JP | 59-102586 | 6/1984 |
| JP | 2-100791 | 8/1990 |
| JP | 3-60988 | 3/1991 |
| JP | 6-91582 | 4/1994 |
| JP | 2001-105378 | 4/2001 |
| JP | 3226219 | 8/2001 |
| JP | 3245095 | 10/2001 |

* cited by examiner

*Primary Examiner*—Paul T Chin
(74) *Attorney, Agent, or Firm*—Wenderoth, Lind & Ponack, L.L.P.

(57) ABSTRACT

A multi-joint drive mechanism includes a bone-member layer member (101) in which a plurality of bone members are arranged in arrays and in a generally planar fashion, the plurality of bone members being movably coupled at coupling portions (3A), and elastically expanding/contracting members (3) which are arranged so as to stretch over the coupling portions on one side or both sides of the bone-member layer member and moreover which are fixed between the plurality of bone members, wherein the multi-joint drive mechanism drives flexural motions of joints between the plurality of adjoining bone members by expanding or contracting the elastically expanding/contracting member.

21 Claims, 18 Drawing Sheets

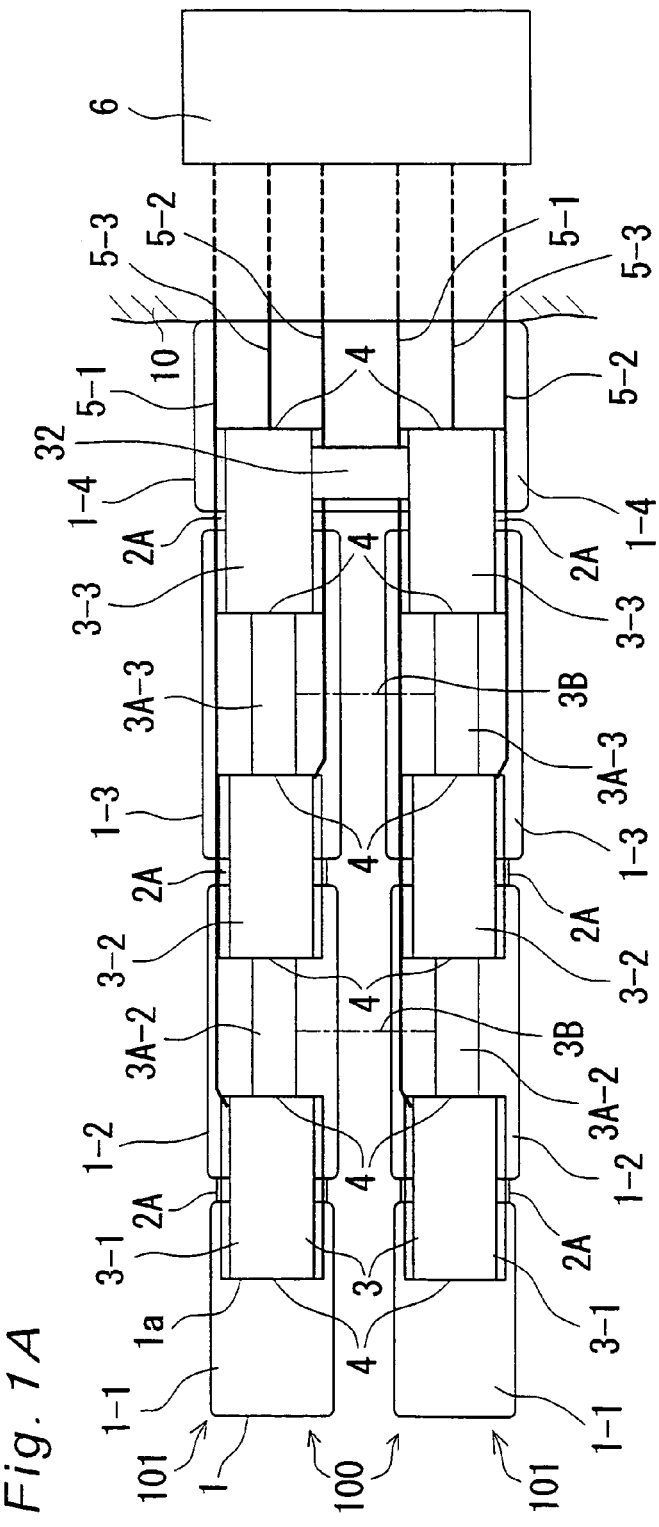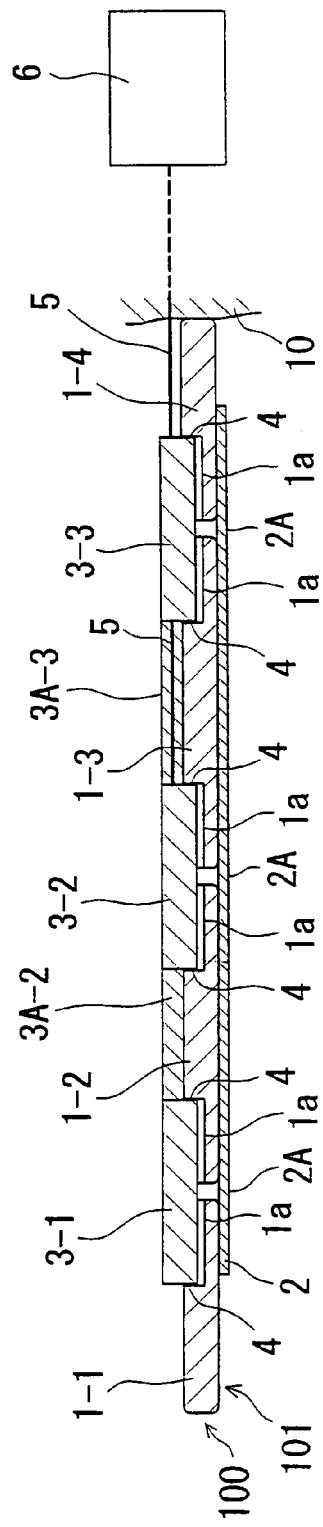

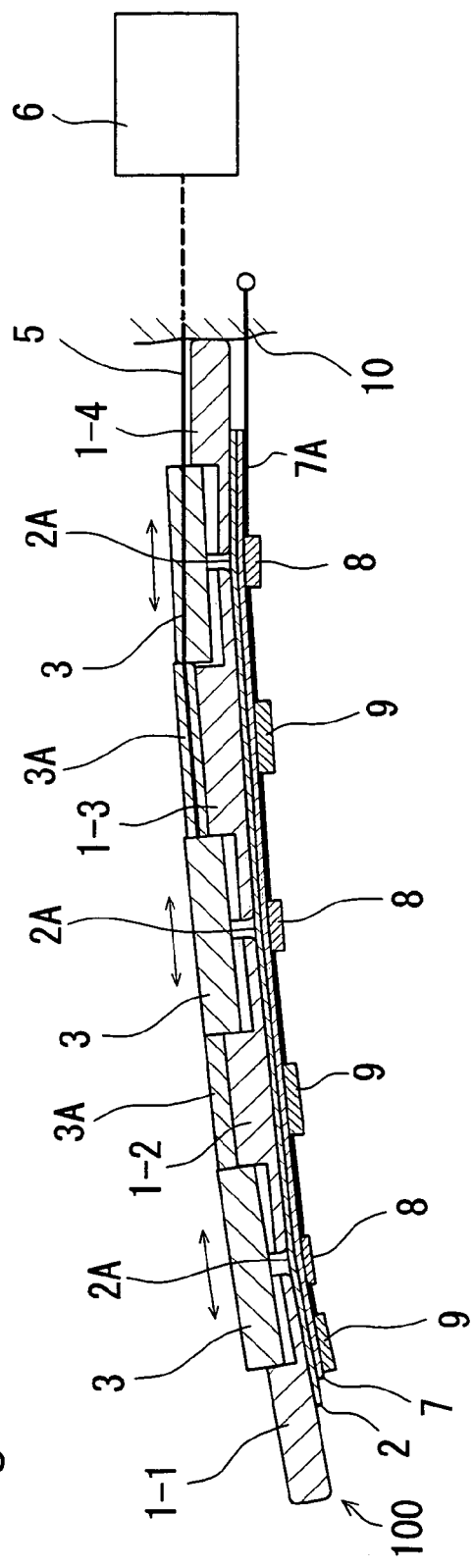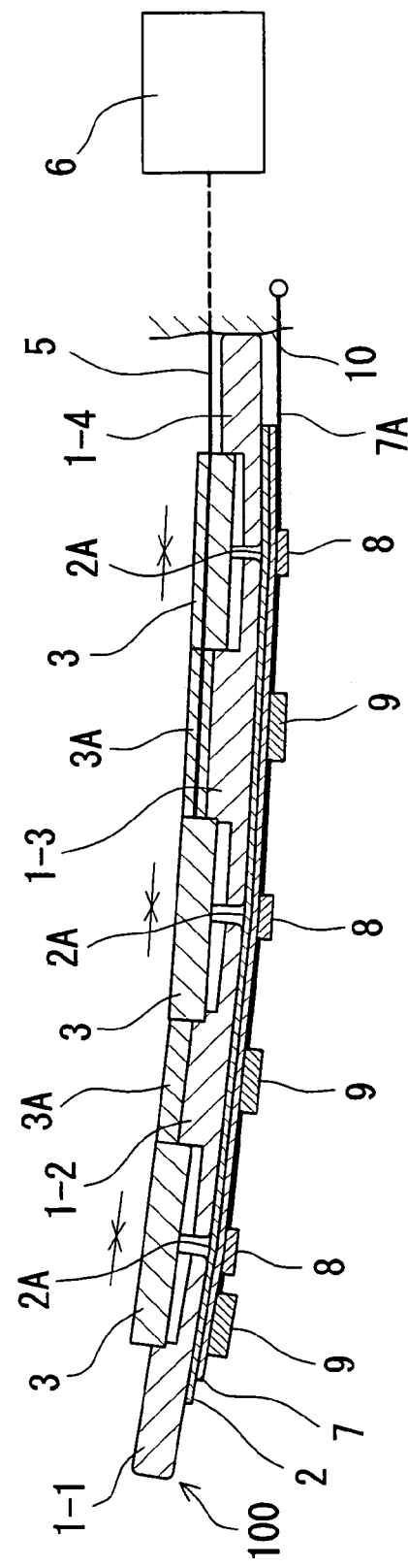

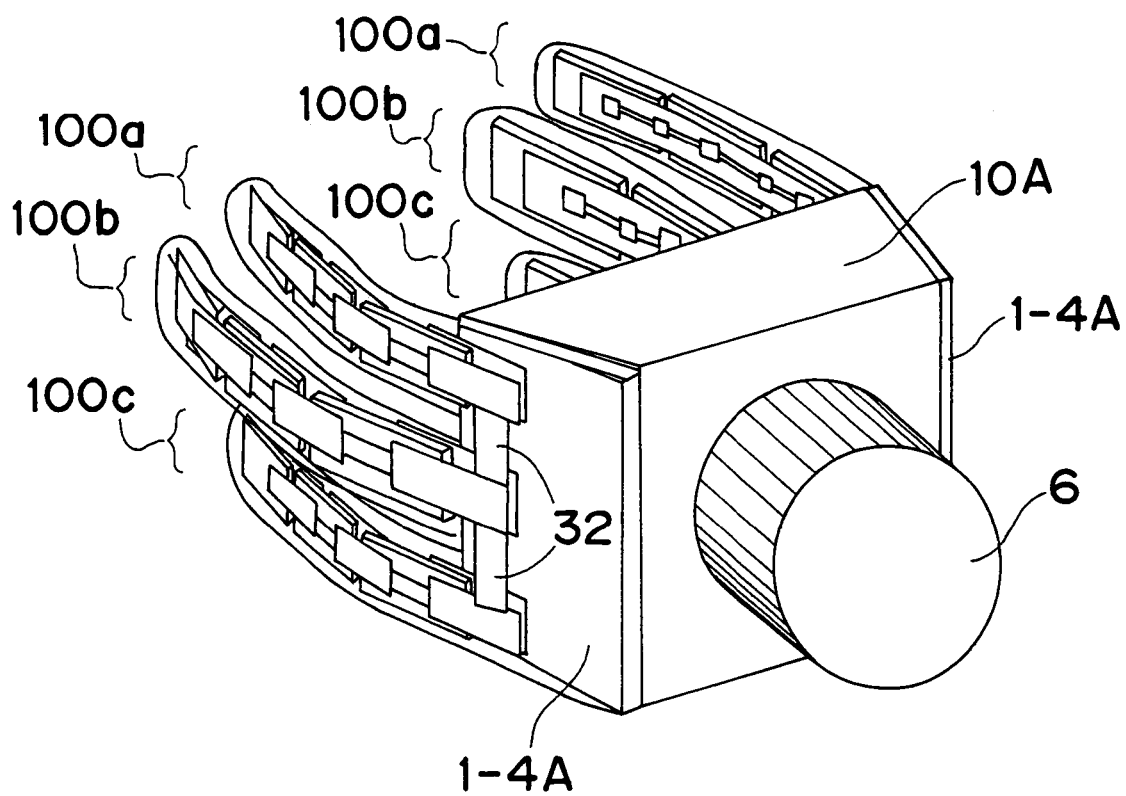

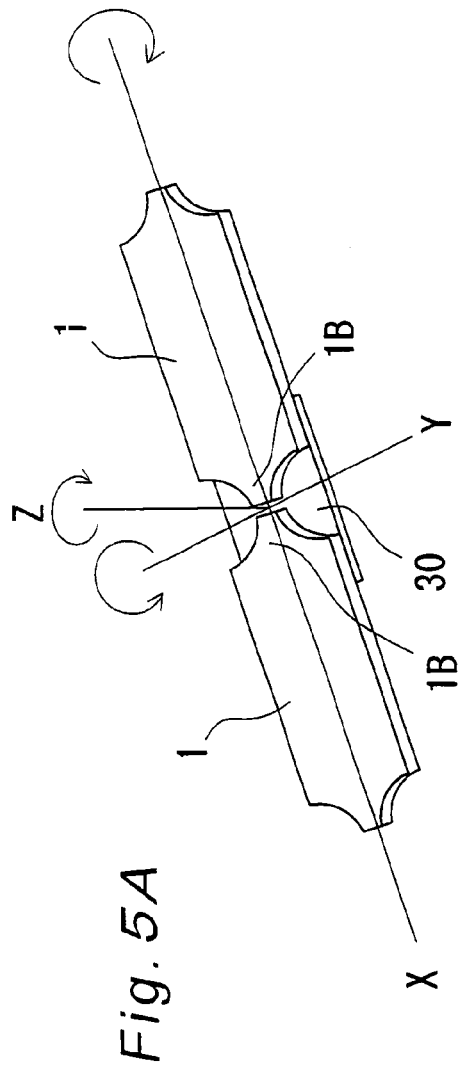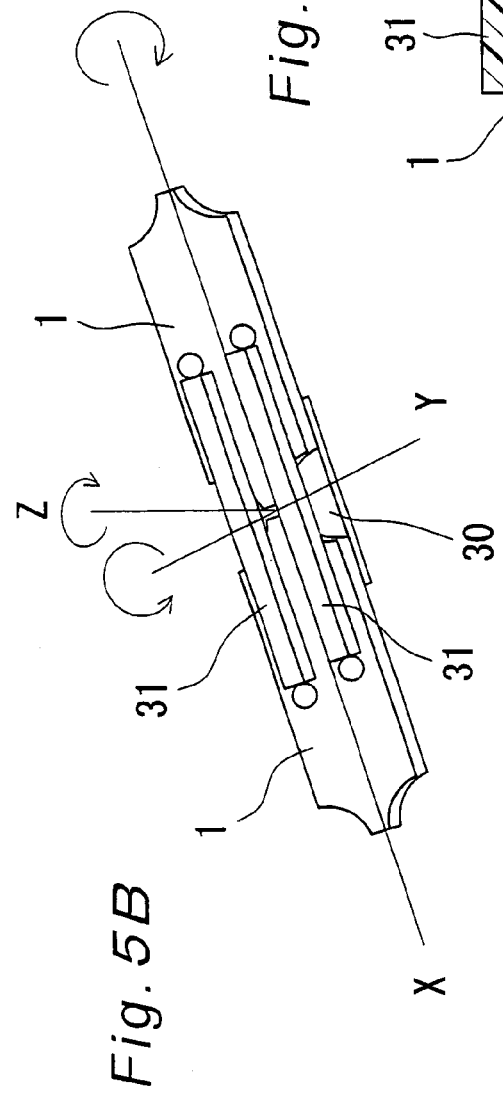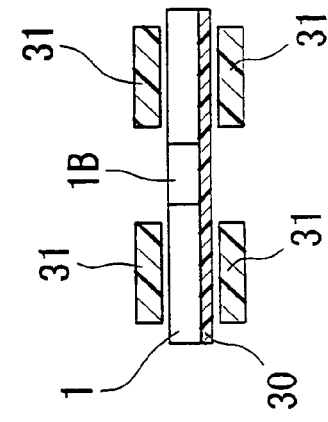

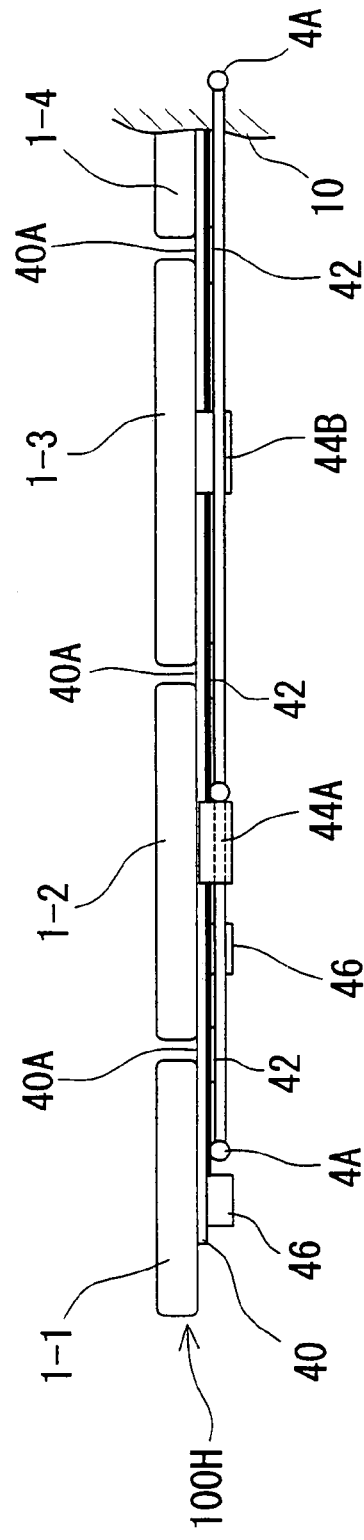
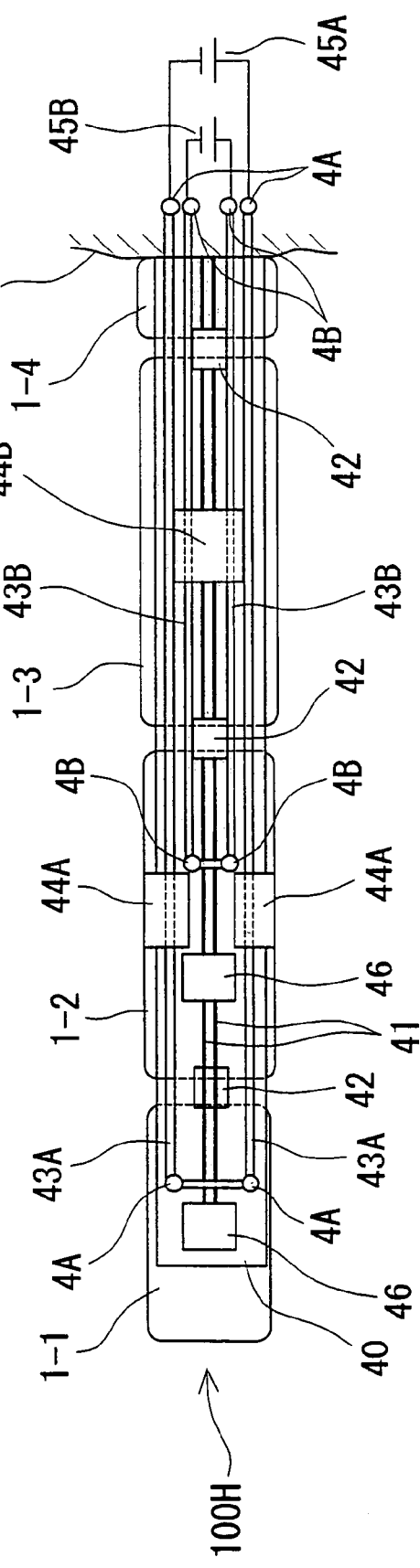

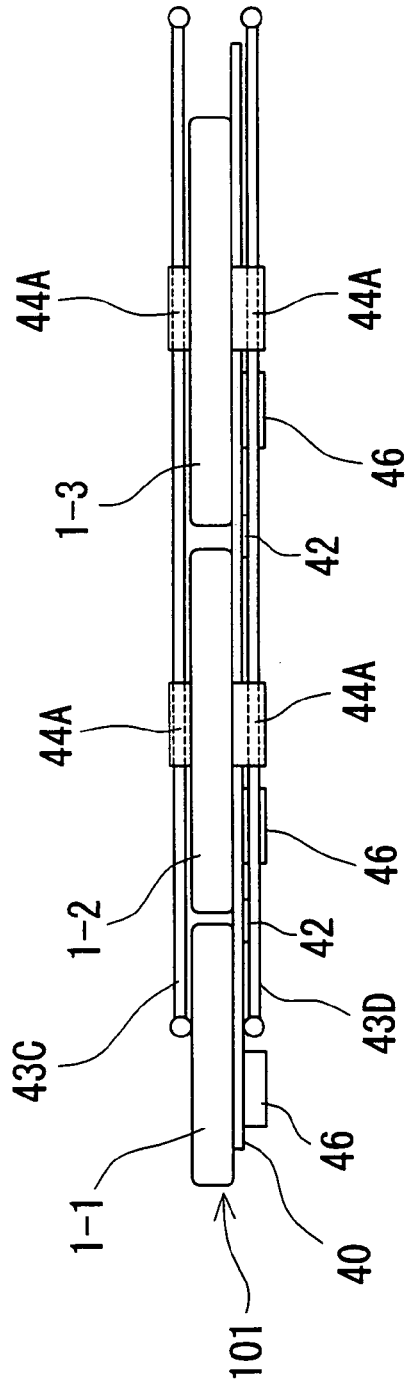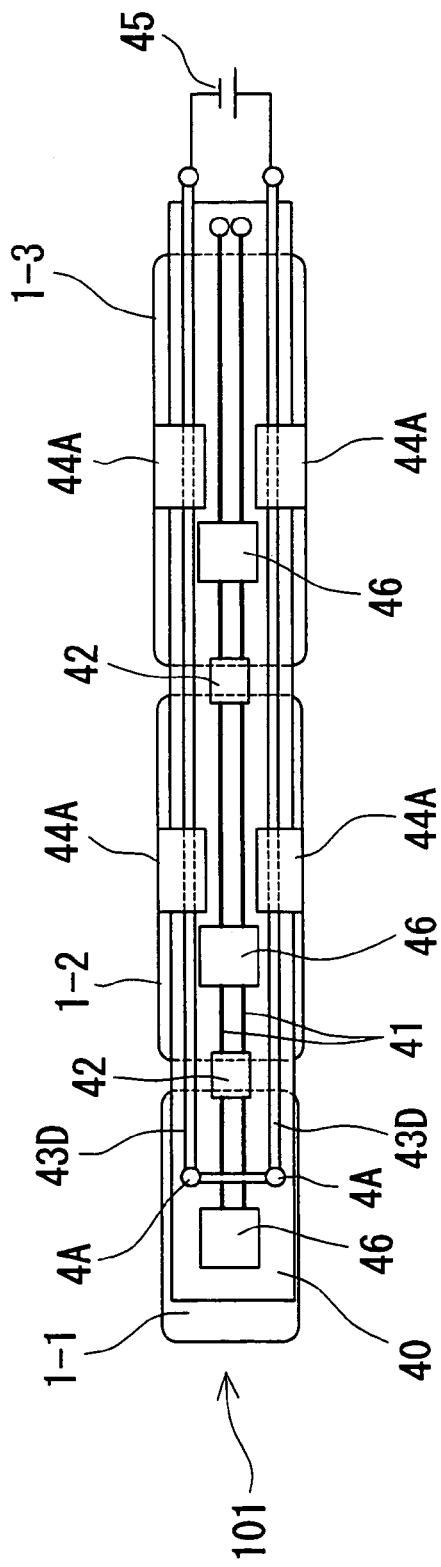

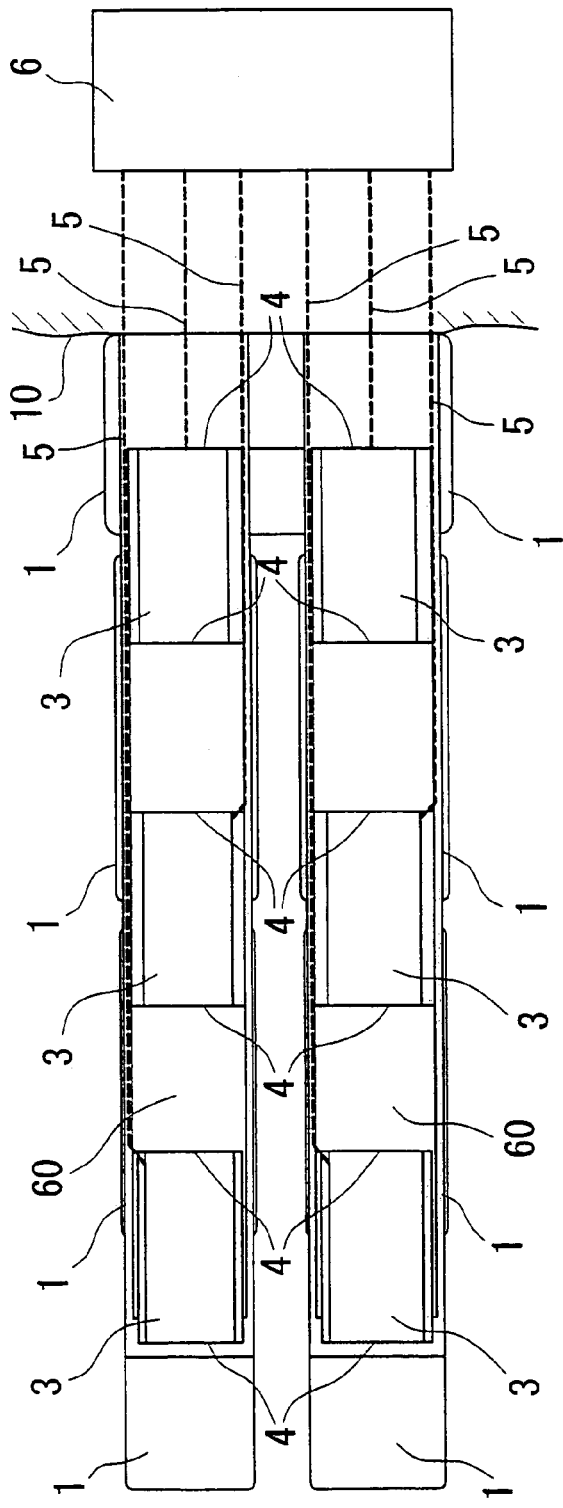
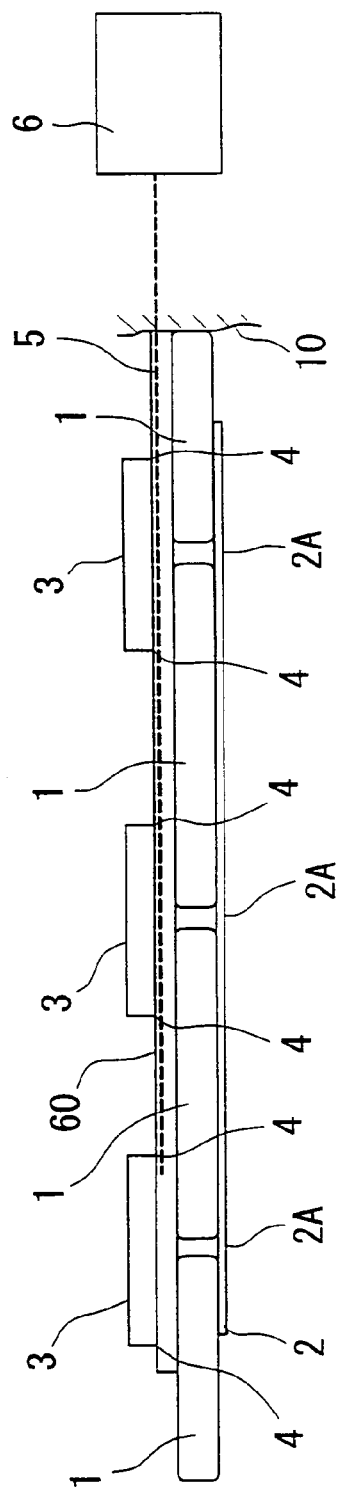
Fig. 11A
Fig. 11B

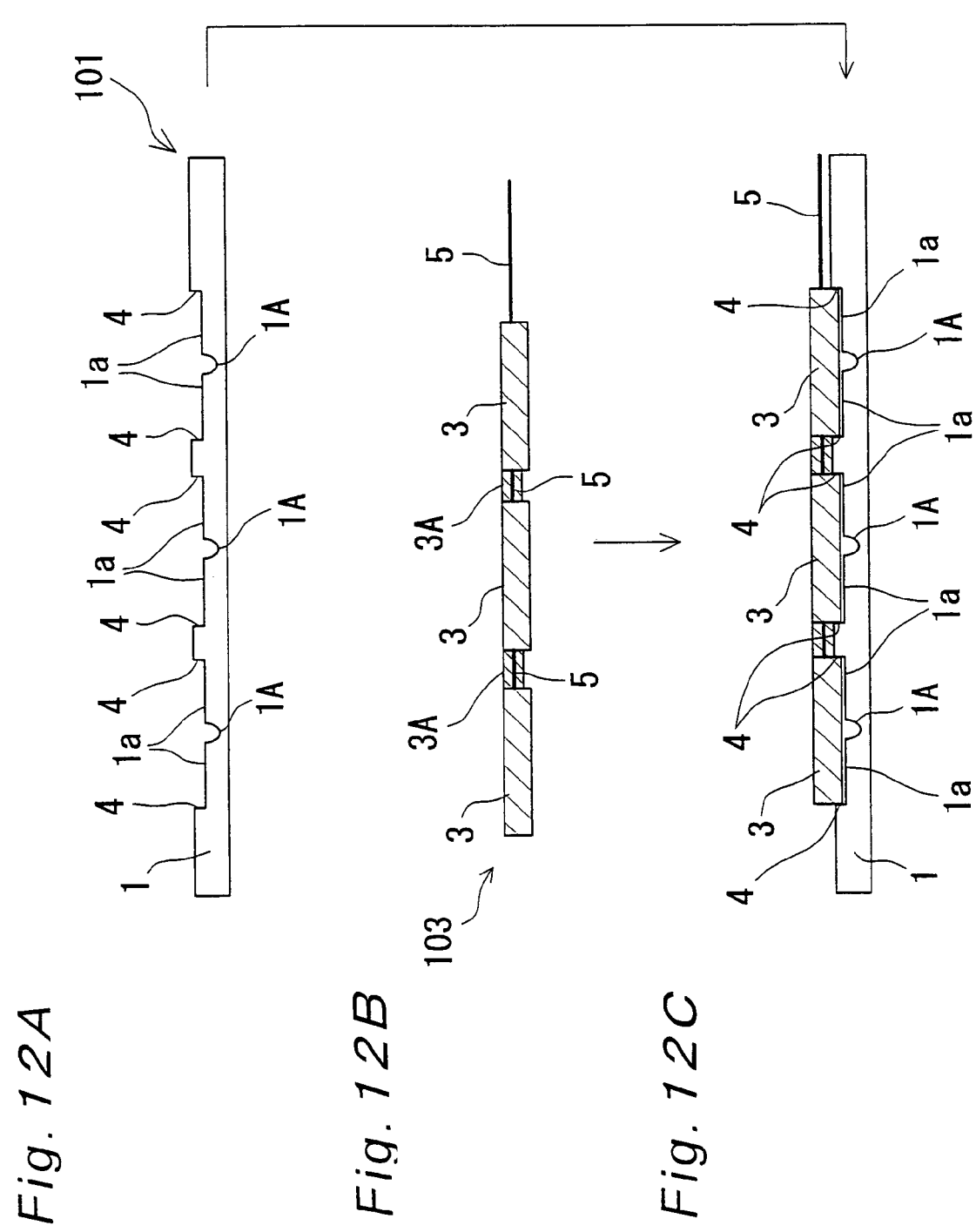

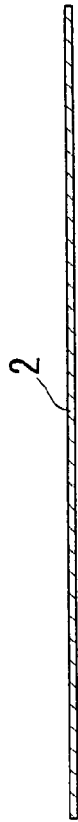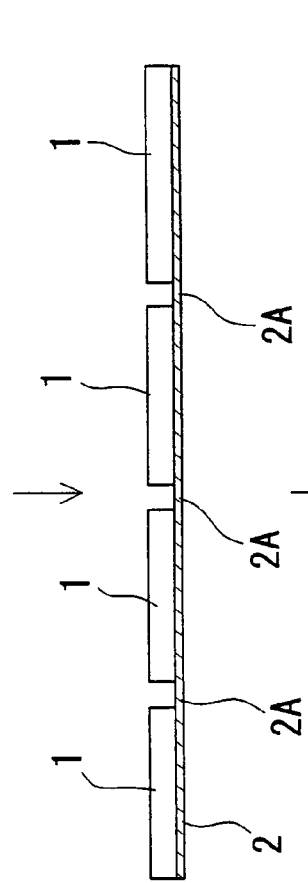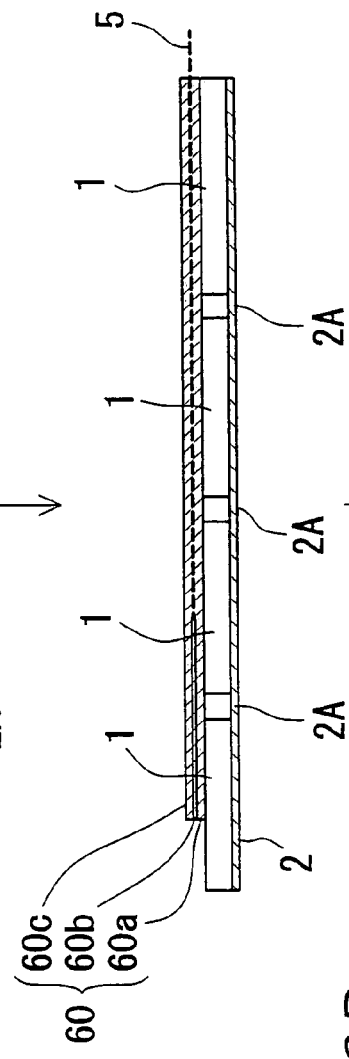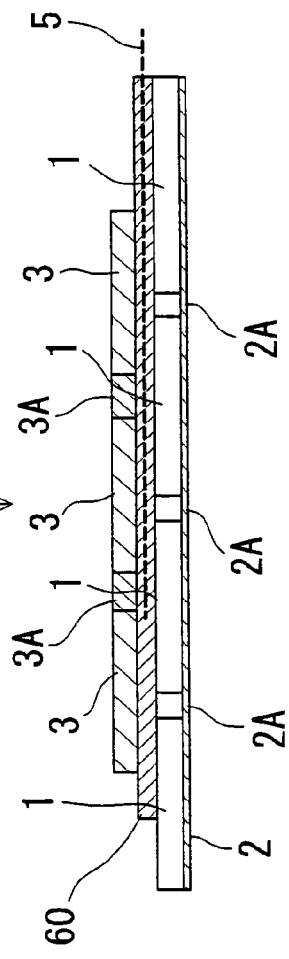
Fig. 13A
Fig. 13B
Fig. 13C
Fig. 13D

ARTICULATED DRIVING MECHANISM, METHOD OF MANUFACTURING THE MECHANISM, AND HOLDING HAND AND ROBOT USING THE MECHANISM

This application is the U.S. National Stage application of PCT/JP03/07914, filed on Jun. 23, 2003, and claims priority to Japanese Application No. 2002-182504, filed on Jun. 24, 2002.

TECHNICAL FIELD

The present invention relates to a multi-joint drive mechanism and a manufacturing method therefor, and a grasping hand and robot using the mechanism. In particular, the present invention relates to a multi-joint drive mechanism, as well as a manufacturing method therefor, capable of grasping various object articles and being simple in structure and low in manufacturing cost, and also relates to a grasping hand and robot using the mechanism.

BACKGROUND ART

The grasping hands in conventional industrial robots have hitherto been proposed in many cases as those for use in in-plant production of products and for precision handling of particular components. On the other hand, the grasping hands for robots that are expected to play active part in household chore support or work support in home, office, hospitals, or the like, as well as in care aid for the aged or the physically impaired and the like are required that the grasping hands themselves be small-sized, lightweight, soft and safe, and moreover capable of dexterously grasping various objects.

With a view to dexterously grasping various objects, a man-type robot hand for research use is disclosed in the Papers of Society of Mechanical Engineers, 66, 651C, 3672/3678 (2000). This robot hand has one 4-joint and 4-degree-of-freedom thumb and four 4-joint and 3-degree-of-freedom fingers, where joints at front ends of the four fingers are provided by link mechanisms and the other joints, in each of which a small-size servomotor is incorporated, is equipped with distribution-type pressure sensors. The robot hand, which has been commercially available for research use, is expensive and restrictive of its use because of its being an assembly of many components.

Also, as a grasping hand in which the grasping hand itself has a soft structure, there has been disclosed in Japanese Examined Patent No. 3226219 a grasping actuator formed of a cylindrical elastic body in which its interior is isolated in three chambers by partition walls. This actuator, while movably operable softly in every direction, yet has difficulties in securely grasping relatively heavyweight articles and in control of its grasping operations because of its having no skeletal structure.

In these prior art examples of grasping hands that have already been reported, there has been disclosed neither a grasping hand nor a robot using the grasping hand, related to the present application, which is driven by a planar-type multi-joint drive mechanism made of a plurality of bone members disposed in array and which is capable of grasping various objects and moreover sample in structure and manufacturable with low cost.

In order to realize and popularize personal robots for household chore support in home or the like, it is an important issue to realize, as a grasping hand to be used in those robots, a grasping hand in which the grasping hand itself is small-sized and lightweight, soft and safe and which has a performance of dexterously grasping various objects and further which is simple in construction and low in manufacturing cost.

An object of the present invention is to provide a multi-joint drive mechanism which can solve the above issues and which has a concrete structure of practicable level including a simplicity of its manufacture as a drive mechanism, and also to provide a manufacturing method for the drive mechanism as well as a grasping hand and a robot using the mechanism.

DISCLOSURE OF INVENTION

In order to achieve the above object, the present invention has the following constitution.

According to the present invention, there is provided a multi-joint drive mechanism comprising a bone-member layer member in which a plurality of bone members are arranged in arrays, the plurality of bone members being movably coupled at coupling portions, and elastically expanding/contracting members which are arranged so as to stretch over the coupling portions on a contact-surface side of the bone-member layer member that makes contact with an object and/or on its noncontact-surface side opposed to the contact-surface side and moreover which are fixed between the plurality of bone members,
    wherein the multi-joint drive mechanism drives flexural motions with the coupling portions between the plurality of adjoining bone members serving as joints by expanding or contracting the elastically expanding/contracting member.

Further, according to the present invention, there is provided a method for manufacturing a multi-joint drive mechanism which comprises a bone-member layer member in which a plurality of bone members are arranged in arrays, the plurality of bone members being movably coupled at coupling portions, and elastically expanding/contracting members which are arranged so as to stretch over the coupling portions on a contact-surface side of the bone-member layer member that makes contact with an object and/or on its noncontact-surface side opposed to the contact-surface side and moreover which are fixed between the plurality of bone members, wherein the multi-joint drive mechanism drives flexural motions with the coupling portions between the plurality of adjoining bone members serving as joints by expanding or contracting the elastically expanding/contracting member, the method comprising:
    collectively forming at least the bone-member layer member in which the plurality of bone members are arranged in a generally planar fashion; and
    coupling an elastically expanding/contracting member-layer member, with which the plurality of elastically expanding/contracting members are integrated, to an adjoining surface of the bone-member layer member on the contact-surface side of the bone-member layer member that makes contact with an object and/or on its noncontact-surface side opposed to the contact-surface side.

Further, according to the present invention, there is provided a grasping hand having a plurality of finger mechanisms provided in opposition, each of the finger mechanisms having a multi-joint drive mechanism which includes a bone-member layer member in which a plurality of bone members are arranged in arrays, the plurality of bone members being movably coupled at coupling portions, and elastically expanding/contracting members which are arranged so as to stretch over the coupling portions on a contact-surface side of the bone-member layer member that makes contact with an object and/or on its noncontact-surface side opposed to the contact-surface side and moreover which are fixed between the plurality of bone members, wherein the multi-joint drive mechanism drives flexural motions with the coupling portions between the plurality of adjoining bone members serving as joints by expanding or contracting the elastically expanding/contracting member, and wherein the grasping hand performs grasping operation for the object by expanding or contracting the elastically expanding/contracting member to drive the finger mechanisms.

Further, according to the present invention, there is provided a robot comprising: a grasping hand having a plurality of multi-joint drive mechanisms, each of the multi-joint drive mechanisms having a bone-member layer member in which a plurality of bone members are arranged in arrays, the plurality of bone members being movably coupled at coupling portions, and elastically expanding/contracting members which are arranged so as to stretch over the coupling portions on a contact-surface side of the bone-member layer member that makes contact with an object and/or on its noncontact-surface side opposed to the contact-surface side and moreover which are fixed between the plurality of bone members, wherein the multi-joint drive mechanisms drive flexural motions with the coupling portions between the plurality of adjoining bone members serving as joints by expanding or contracting the elastically expanding/contracting member; and a pressure-sensitive sensor, friction sensor or other touch sensor, or a displacement sensor for the coupling portions provided on the grasping hand, whereby grasping operation of the grasping hand is controlled based on information detected by the sensor or antenna.

BRIEF DESCRIPTION OF DRAWINGS

These and other aspects and features of the present invention will become clear from the following description taken in conjunction with the preferred embodiments thereof with reference to the accompanying drawings, in which:

FIG. 1A is a plan view of a planar-type joint drive mechanism in a first embodiment of the present invention;

FIG. 1B is a sectional view of the joint drive mechanism of the first embodiment;

FIG. 2C is a sectional view representing a deformed state of the joint drive mechanism of the second embodiment;

FIG. 2D is a sectional view representing a deformed state of the joint drive mechanism of the second embodiment;

FIG. 3B is a perspective view of a 6-finger type grasping hand in the second embodiment of the present invention;

FIG. 5A is a perspective view of a multi-axis rotary type elastic hinge in a third embodiment of the present invention;

FIG. 5B is a perspective view of a drive mechanism for the multi-axis rotary type elastic hinge in the third embodiment;

FIG. 5C is a sectional view of a drive mechanism for the multi-axis rotary type elastic hinge in the third embodiment;

FIG. 7A is a sectional view of a planar-type joint drive mechanism in a fourth embodiment of the present invention;

FIG. 7B is a plan view of the planar-type joint drive mechanism in the fourth embodiment of the present invention;

FIG. 8A is a sectional view of an antagonistic drive type joint drive mechanism in the fourth embodiment of the present invention;

FIG. 8B is a plan view of the antagonistic drive type joint drive mechanism in the fourth embodiment of the present invention;

FIG. 11A is a sectional view of a joint drive mechanism in a fifth embodiment of the present invention;

FIG. 11B is a plan view of the joint drive mechanism in the fifth embodiment of the present invention;

FIGS. 12A, 12B, and 12C are block diagrams, respectively, showing a manufacture of the joint drive mechanism of the present invention;

FIGS. 13A, 13B, 13C, and 13D are block diagrams, respectively, showing another manufacture of the joint drive mechanism of the present invention.

BEST MODE FOR CARRYING OUT THE INVENTION

Figure 1C:
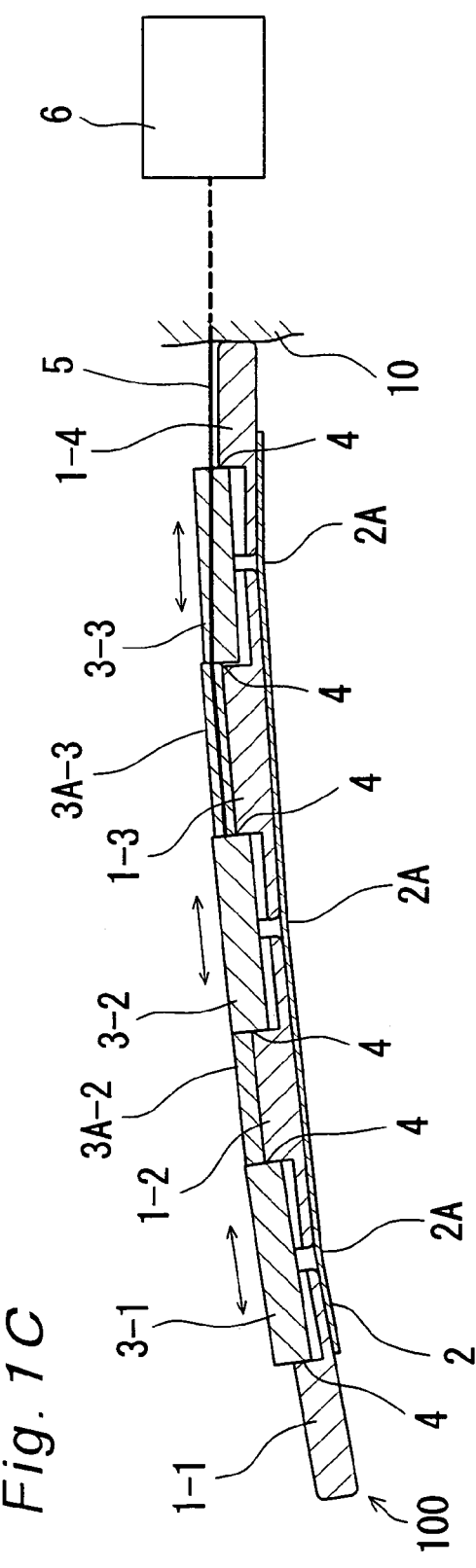
FIG. 1C is a sectional view representing a deformed state of the joint drive mechanism of the first embodiment.

Before the description of the present invention proceeds, it is to be noted that like parts are designated by like reference numerals throughout the accompanying drawings.

Hereinbelow, various aspects of the present invention will be described below before embodiments of the present invention are described in detail with reference to the accompanying drawings.

According to a first aspect of the present invention, there is provided a multi-joint drive mechanism comprising a bone-member layer member in which a plurality of bone members are arranged in arrays, the plurality of bone members being movably coupled at coupling portions, and elastically expanding/contracting members which are arranged so as to stretch over the coupling portions on a contact-surface side of the bone-member layer member that makes contact with an object and/or on its noncontact-surface side opposed to the contact-surface side and moreover which are fixed between the plurality of bone members, wherein the multi-joint drive mechanism drives flexural motions with the coupling portions between the plurality of adjoining bone members serving as joints by expanding or contracting the elastically expanding/contracting member.

According to a second aspect of the present invention, there is provided the multi-joint drive mechanism as defined in the first aspect, wherein a degree of freedom of the coupling portions is given generally only by a degree of rotational freedom and the degree of freedom of the coupling portions at least of proximities of their forward ends is restrained to one degree of freedom about an axis generally perpendicular to a direction the arrays of the bone-member layer member.

According to a third aspect of the present invention, there is provided the multi-joint drive mechanism as defined in the second aspect, wherein the coupling portions are constructed by hinges each formed of a flat spring.

According to a fourth aspect of the present invention, there is provided the multi-joint drive mechanism as defined in the second aspect, wherein the coupling portions are hinges formed of the bone members themselves by constricting a part of the bone members.

According to a fifth aspect of the present invention, there is provided the multi-joint drive mechanism as defined in the first aspect, wherein a flexible wiring board having signal lines for connection of deformation sensors for detecting deformation amount of the coupling portions, and drive lines for electrically driving the elastically expanding/contracting members is disposed in proximities to flexural portions of the coupling portions.

According to a sixth aspect of the present invention, there is provided the multi-joint drive mechanism as defined in the fifth aspect, wherein the flexible wiring board serves also as hinges each formed of a flat spring.

According to a seventh aspect of the present invention, there is provided the multi-joint drive mechanism as defined in any one of the first to sixth aspects, further comprising a device for expanding or contracting the elastically expanding/contracting member, the device being a device which is driven with air pressure applied to a rubber elastic member or a device which is driven by heating and cooling shape-memory material or a device which is driven with an electric field applied to electro-active polymer.

According to an eighth aspect of the present invention, there is provided the multi-joint drive mechanism as defined in the seventh aspect, wherein the elastically expanding/contracting member is formed of a rubber elastic member, and the device for expanding or contracting the elastically expanding/contracting member is a device for performing drive by application of air pressure to the rubber elastic member, the multi-joint drive mechanism further comprising a multilayer-type pneumatic piping layer member having piping for applying air pressure to the rubber elastic member.

According to a ninth aspect of the present invention, there is provided a method for manufacturing a multi-joint drive mechanism which comprises a bone-member layer member in which a plurality of bone members are arranged in arrays, the plurality of bone members being movably coupled at coupling portions, and elastically expanding/contracting members which are arranged so as to stretch over the coupling portions on a contact-surface side of the bone-member layer member that makes contact with an object and/or on its non-contact-surface side opposed to the contact-surface side and moreover which are fixed between the plurality of bone members, wherein the multi-joint drive mechanism drives flexural motions with the coupling portions between the plurality of adjoining bone members serving as joints by expanding or contracting the elastically expanding/contracting member, the method comprising:

collectively forming at least the bone-member layer member in which the plurality of bone members are arranged in a generally planar fashion; and coupling an elastically expanding/contracting member-layer member, with which the plurality of elastically expanding/contracting members are integrated, to an adjoining surface of the bone-member layer member on the contact-surface side of the bone-member layer member that makes contact with an object and/or on its non-contact-surface side opposed to the contact-surface side.

According to a 10th aspect of the present invention, there is provided a grasping hand having a plurality of finger mechanisms provided in opposition, each of the finger mechanisms having a multi-joint drive mechanism which includes a bone-member layer member in which a plurality of bone members are arranged in arrays, the plurality of bone members being movably coupled at coupling portions, and elastically expanding/contracting members which are arranged so as to stretch over the coupling portions on a contact-surface side of the bone-member layer member that makes contact with an object and/or on its noncontact-surface side opposed to the contact-surface side and moreover which are fixed between the plurality of bone members, wherein the multi-joint drive mechanism-drives flexural motions with the coupling portions between the plurality of adjoining bone members serving as joints by expanding or contracting the elastically expanding/contracting member, and wherein the grasping hand performs grasping operation for the object by expanding or contracting the elastically expanding/contracting member to drive the finger mechanisms.

According to an 11th aspect of the present invention, there is provided the grasping hand as defined in the 10th aspect, wherein the grasping hand is enabled to grasp the object by the plurality of finger mechanisms provided in oppositions and has, at least on a grasping surface side of the grasping hand, touch sensors such as pressure-sensitive sensors or friction sensors, or displacement sensors for the coupling portions, or tag information detection antennas, wherein grasping operation is controlled based on information detected by the sensors or antennas.

According to a 12th aspect of the present invention, there is provided the grasping hand as defined in the 10th or 11th aspect, wherein at least a part of the grasping surface side of the grasping hand is covered with a high-friction soft material such as rubber.

According to a 13th aspect of the present invention, there is provided the grasping hand as defined in the 10th or 11th aspect, wherein the elastically expanding/contracting member is provided on an outer side-face side of the grasping hand, the elastically expanding/contracting member including both expansion type and contraction type ones so as to drive the grasping operation by antagonistic action of both types.

According to a 14th aspect of the present invention, there is provided the grasping hand as defined in the ninth or 11th aspect, wherein a grasping-object information detection device such as an ultrasonic type or image pick-up type or other grasping object detection sensor or camera or a tag information detection antenna is provided at a base portion of the grasping hand, whereby the grasping operation is controlled based on grasping-object information detected by the grasping-object information detection device.

According to a 15th aspect of the present invention, there is provided a robot comprising: a grasping hand having a plurality of multi-joint drive mechanisms, each of the multi-joint drive mechanisms having a bone-member layer member in which a plurality of bone members are arranged in arrays, the plurality of bone members being movably coupled at coupling portions, and elastically expanding/contracting members which are arranged so as to stretch over the coupling portions on a contact-surface side of the bone-member layer member that makes contact with an object and/or on its non-contact-surface side opposed to the contact-surface side and moreover which are fixed between the plurality of bone members, wherein the multi-joint drive mechanisms drive flexural motions with the coupling portions between the plurality of adjoining bone members serving as joints by expanding or contracting the elastically expanding/contracting member; and a pressure-sensitive sensor, friction sensor or other touch sensor, or a displacement sensor for the coupling portions provided on the grasping hand, whereby grasping operation of the grasping hand is controlled based on information detected by the sensor or antenna.

According to a 16th aspect of the present invention, there is provided the robot as defined in the 15th aspect, further comprising a grasping-object information detection device such as an ultrasonic type or image pick-up type or other grasping object detection sensor or camera or a tag information detection antenna, whereby the grasping operation of the grasping hand is planned and controlled based on grasping-object information detected by the grasping-object information detection device.

According to a 17th aspect of the present invention, there is provided the multi-joint drive mechanism as defined in the first aspect, wherein the bone-member layer member has the plurality of bone members arranged in arrays and in a generally planar fashion.

Now various embodiments of the present invention will be described below with reference to the accompanying drawings.

FIRST EMBODIMENT

FIGS. 1A and 1B are a plan view and a sectional view, respectively, of planar-type (flat plane-type in this case) joint drive mechanisms 100, 100 in a first embodiment of the present invention. The joint drive mechanisms 100, 100 shown in FIGS. 1A to 1D are driven by a driving source which is a pneumatic actuator that expands with air pressure applied thereto.

In FIGS. 1A and 1B, a plurality of bone members 1, e.g. four rectangular-plate-shaped bone members 1 (reference numerals 1-1, 1-2, 1-3, 1-4 are used when places are specifically designated, and reference numeral 1 is generically used when not) are coupled to each other by one elongated rectangular-plate-shaped coupling member 2, where respective adjoining bone members 1 and 1 are made movable relative to each other by respective coupling portions 2A of the coupling member 2 (i.e., portions that function as joints of the multi-joint drive mechanism 100), and where elastic expansion/contraction members 3 (reference numerals 3-1, 3-2, 3-3 are used when places are specifically designated, and reference numeral 3 is generically used when not) are fixed to the bone members 1-1, 1-2, 1-3, 1-4 by fixing portions 4, . . . , 4 to so as to stretch over those coupling portions 2A, . . . , 2A. These fixing portions 4 serve as portions that exert force on the bone members 1, respectively, upon expansion and contraction of the elastic expansion/contraction members 3, and need to be fixed at these sites to transfer this force. Therefore, the fixing portions 4 are formed of a structure, for example, that protruding portions provided in the elastic expansion/contraction members 3 are fitted into recessed portions 1a provided in the bone members 1.

In this case, the four bone members 1 (1-1, 1-2, 1-3, 1-4) are so structured that the bone member 1-1 at the forward end (left end of FIG. 1A) is roughly equal in length to the bone member 1-4 at the base end (right end of FIG. 1A), and that the second bone member 1-2 and the third bone member 1-3 are roughly equal in length to each other and longer than the forward end bone member 1-1, thus the structure being close to that of the human arm. The joint drive mechanisms 100, 100, although shown as being arranged in two arrays in FIG. 1A, yet may actually be arranged in opposition to each other so as to be enabled to fulfill grasping operation or the like. Also, a base end portion of each base-end side bone member 1-4 is fixed at a fixing portion 10 of each multi-joint drive mechanism 100.

The bone members 1-1, 1-2, 1-3, 1-4 are provided by using flat plates of high-in-rigidity but light-in-weight plastics such as polyethylene or its foams. The plurality of bone members 1-1, 1-2, 1-3, 1-4 are arranged in array in straight line along their longitudinal direction (array direction), and moreover the plurality of bone members 1-1, 1-2, 1-3, 1-4 as a whole form a bone-member layer member 101 that is disposed in a generally planar mode.

The coupling member 2 is provided by using a flat spring made of a metal such as phosphor bronze or stainless or a plastic such as polypropylene or polyethylene terephthalate, and end portions of the coupling member 2 are bonded to the recessed portions 1a, 1a of adjoining bone members 1, 1, respectively, by means of adhesive, and an elastic hinge is formed between the two adjacent bone members 1, 1 at their coupling portions 2A so that to the coupling member 2 is given a degree of freedom of rotation around one axis of a direction (vertical direction in FIG. 1A) perpendicular to the longitudinal direction of the coupling portions 2A.

The elastic expansion/contraction members 3 (3-1, 3-2, 3-3), containing therein a device that expands or contracts the relevant elastically expanding/contracting member 3, are formed of neoprene or silicon or other rubber so as to have an outer shape generally close to a flat shape and have in their interior a pneumatic operation chamber communicating with air-pressure introducing passages 5 (reference numerals 5-1, 5-2, 5-3 are used when places are specifically designated, and reference numeral 5 is generically used when not), and further contain pneumatic actuators 3-1, 3-2, 3-3 which expands along the lengthwise direction by application of air pressure with the air pressure introduced from the air-pressure introducing passages 5-1, 5-2, 5-3 into the pneumatic operation chamber. Also, these pneumatic actuators 3-1, 3-2, 3-3 contract along their lengthwise direction by the air pressure being conversely reduced below the atmospheric pressure. Out of these plural pneumatic actuators 3-1, 3-2, 3-3, adjacent pneumatic actuators are coupled together by an elastically expanding/contracting member coupling portion 3A made of the same rubber material (reference numerals 3A-2, 3A-3 are used when places are specifically designated, and reference numeral 3A is generically used when not), and integrated together as a whole. In order that this integrated elastically expanding/contracting member-layer member 103 is stacked collectively on the bone-member layer member 101, the pneumatic actuators may also be coupled also at elastically expanding/contracting member coupling portions 3B, 3B as required to form a whole structure, and thereafter cut off.

The individual pneumatic actuators 3-1, 3-2, 3-3, which are the elastically expanding/contracting members 3-1, 3-2, 3-3, are connected to a pneumatic controller 6 by a plurality of air-pressure introducing passages 5-1, 5-2, 5-3, respectively, and driven by control of air pressure.

Figure 14:
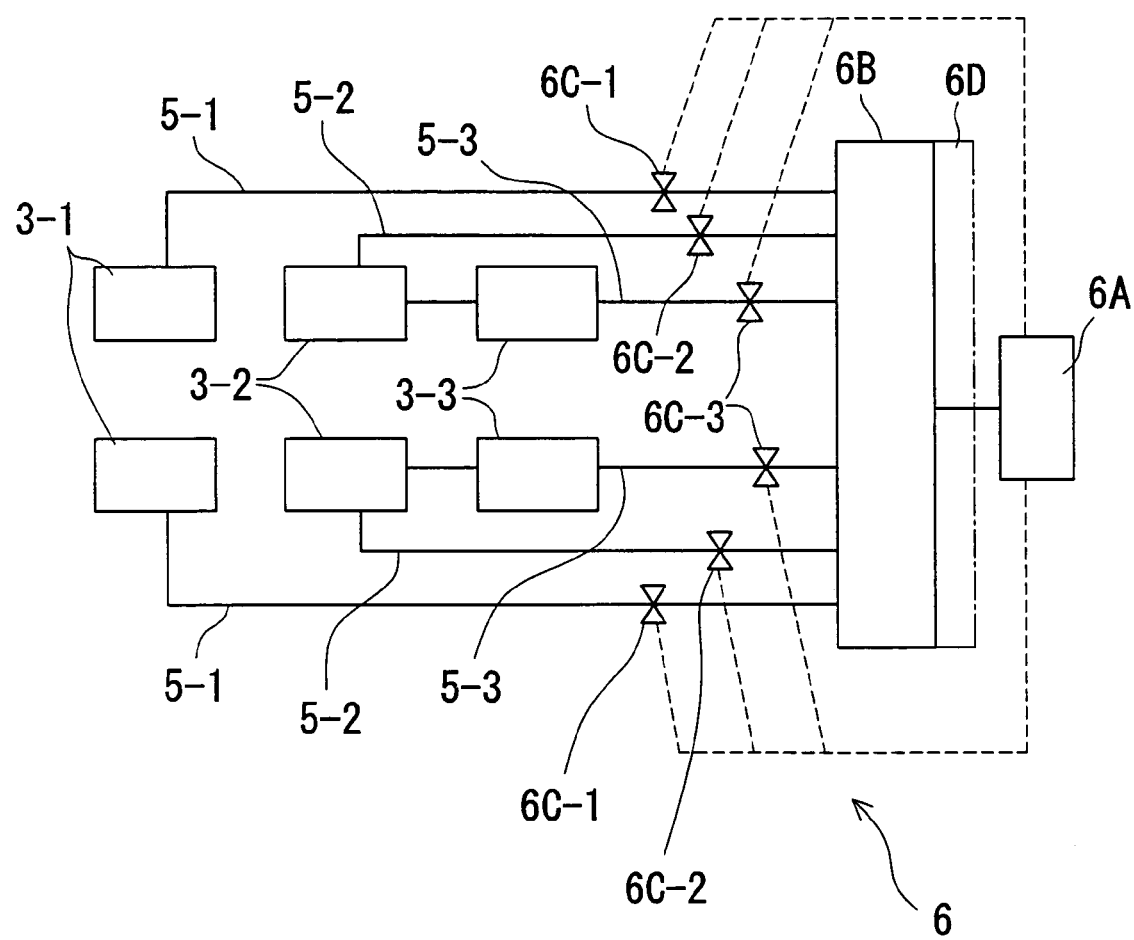
FIG. 14 is a block diagram showing the structure around the pneumatic control of the planar-type joint drive mechanism in the first embodiment of the present invention.

As shown in FIG. 14, the pneumatic controller 6 is composed roughly of an air-pressure driving source 6B such as a pressurization pump, opening/closing valves 6C-1, 6C-2, 6C-3, such as solenoid valves, interposed at connection end portions of the air-pressure introducing passages 5-1, 5-2, 5-3 connected to the air-pressure driving source 6B, and a control section 6A which performs drive control of the air-pressure driving source 6B as well as opening and closing control of the opening/closing valves 6C-1, 6C-2, 6C-3. Under the drive control of the air-pressure controller 6B by the control section 6A, necessary opening/closing valve(s) 6C-1, 6C-2, 6C-3 are opened so that compressed air is supplied from the air-pressure controller 6B to necessary air-pressure introducing passage(s) 5-1, 5-2, 5-3, by which necessary elastically expanding/contracting member(s) 3-1, 3-2, 3-3 are expanded, respectively.

The air-pressure introducing passages 5-1, 5-2, 5-3 are provided by using pneumatic line tubes made of polyurethane, and rubber actuators 3-1, 3-2, 3-3 and connection joint components are connected together, as required, by means of adhesion, press fit, or the like. These air-pressure introducing passages 5-1, 5-2, 5-3 may also be formed inside elastically expanding/contracting member coupling portions 3A-2, 3A-3.

As a concrete example, a 150 mm long one-finger structure multi-joint drive mechanism was fabricated with a structure that four 5 mm thick, 18 mm wide, and 20 mm-50 mm long bone members made of expanded polyethylene resin were used as the bone members 1, a 0.25 mm-thick thin sheet of polyethylene terephthalate resin was bonded as the coupling member 2 on those bone members, and 5 mm thick-in-outer-diameter, 13 mm wide, and 10 mm long hollow members made of neoprene rubber as the elastically expanding/contracting members 3 as well as air line tubes made of 4 mm-dia. polyurethane resin as the coupling portions 3A were coupled to the bone members 1 for both piping and coupling use. As a result, the weight of the multi-joint drive mechanism was as light as 20 gf.

It is noted that reference numeral 32 in FIG. 1A is an elastically expanding/contracting member disposed so as to be stretched over the base end portions of the bone members between the bone member arrays, where the gap between the bone member arrays of the multi-joint drive mechanisms 100, 100 can be efficiently widened by making this elastically expanding/contracting member 32 expanded.

Figure 1D:
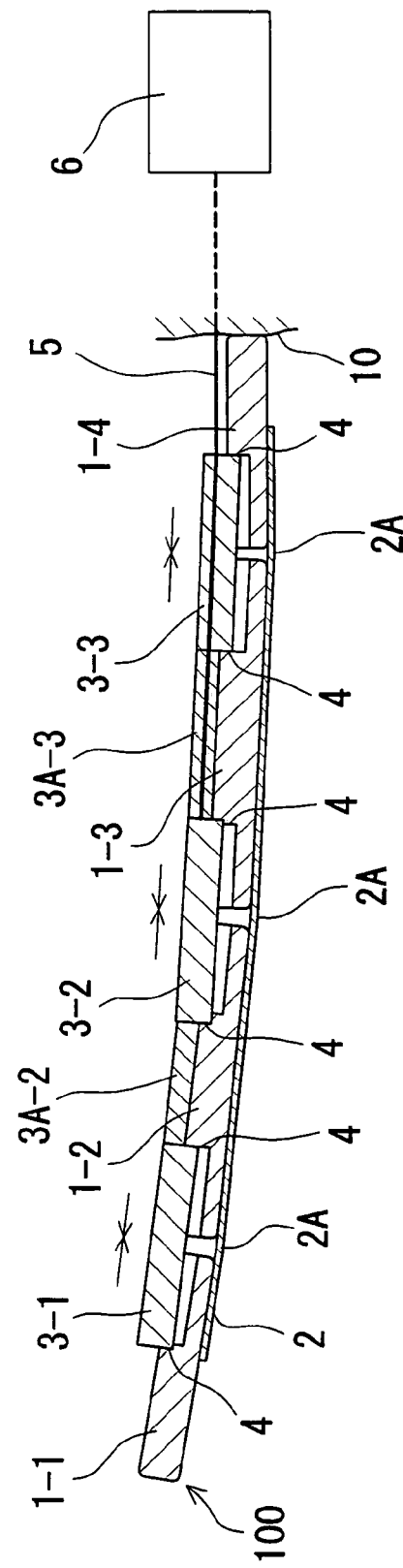
FIG. 1D is a sectional view representing a deformed state of the joint drive mechanism of the first embodiment.

FIGS. 1C and 1D are sectional views representing deformed states of the respective joint drive mechanisms 100 that are expanded or contracted with air pressure applied to the pneumatic rubber actuators 3-1, 3-2, 3-3, which are the elastically expanding/contracting members 3-1, 3-2, 3-3, or with the pressure reduced to below the atmospheric pressure, by the pneumatic controller 6. FIG. 1C shows a state in which the actuators 3-1, 3-2, 3-3 are expanded in their longitudinal direction by the application of air pressure and thus are bent with portions of the coupling member 2, i.e. the coupling portions 2A, serving as elastic hinges. In a case where the flat spring is used as the coupling member 2, although a restoring force acts by virtue of the elasticity of the spring, yet enough large force is generated by the pneumatic actuators 3-1, 3-2, 3-3 against the restoring force, thus allowing the individual multi-joint drive mechanisms 100 to be bent in upward protrusions of FIG. 1C at their hinge portions, respectively. FIG. 1D shows a state that the actuators 3-1, 3-2, 3-3 are contracted in their longitudinal direction by reduction of air pressure (pressure reduction to below the atmospheric pressure). In this case, the actuators 3-1, 3-2, 3-3 are deformed so as to be bent in a direction opposite to that of FIG. 1C, i.e., in downward protrusions of FIG. 1D. The pressure reduction can be achieved by a pressure-reducing pump (vacuum pump) 6D (see FIG. 14) which is provided and set in the pneumatic controller 6 independent of the pressurization pump 6B, and by switching this pressure-reducing pump with the valves. In either case, the amount of resultant deformation can easily be changed by changing the pressure of pressurization or reduction. It is noted that although a case of deformation in the opposite direction by pressure reduction has been explained in FIG. 1D, yet it is also possible that with the pneumatic actuators 3-1, 3-2, 3-3 operated only for pressurization, the individual multi-joint drive mechanisms 100 are restored to the original posture with the restoring force of the elasticity of the flat spring by canceling the pressurization.

According to the first embodiment, the plurality of bone members 1-1, 1-2, 1-3, 1-4 are disposed in a planar arrangement in an identical layer, while the elastically expanding/contracting members 3-1, 3-2, 3-3 are also provided in adjacency to one side of this layer, thus making up a planar-type thin drive mechanism composed of the bone members 1-1, 1-2, 1-3, 1-4, the coupling member 2, and the elastically expanding/contracting members 3-1, 3-2, 3-3. As a result, there is provided a small-sized, lightweight joint drive mechanism.

Also in terms of manufacture, since the bone-member layer member 101 in which the plurality of bone members 1-1, 1-2, 1-3, 1-4 are disposed in a generally planar arrangement can be collectively formed up and moreover the elastically expanding/contracting members 3-1, 3-2, 3-3 can be coupled to their adjoining surfaces of the bone-member layer member 101, there can be provided a device which can be manufactured by a manufacturing method good at collective mass productivity even with a structure in which a multiplicity of bone members 1-1, 1-2, 1-3, 1-4 are coupled, and yet which is low in price.

Further, even in a case where a multiplicity of bone members 1-1, 1-2, 1-3, 1-4 are separately provided, these members are positioned on the same bone-member layer member 101, and thus, it is also possible, as in the foregoing case of the integrated pneumatic actuators 3-1, 3-2, 3-3, that those bone members are disposed in a planar structure and coupled at dummy coupling portions, in which arrangement the elastic expanding/contracting members 3 are coupled to their adjoining surfaces and thereafter separated at these dummy coupling portions. The coupling at these portions may be achieved simply by such a means as fitting, press fit, or adhesion into the respective recessed portions 1a formed in the bone members 1-1, 1-2, 1-3, 1-4.

SECOND EMBODIMENT

Figures 2A, 2B:
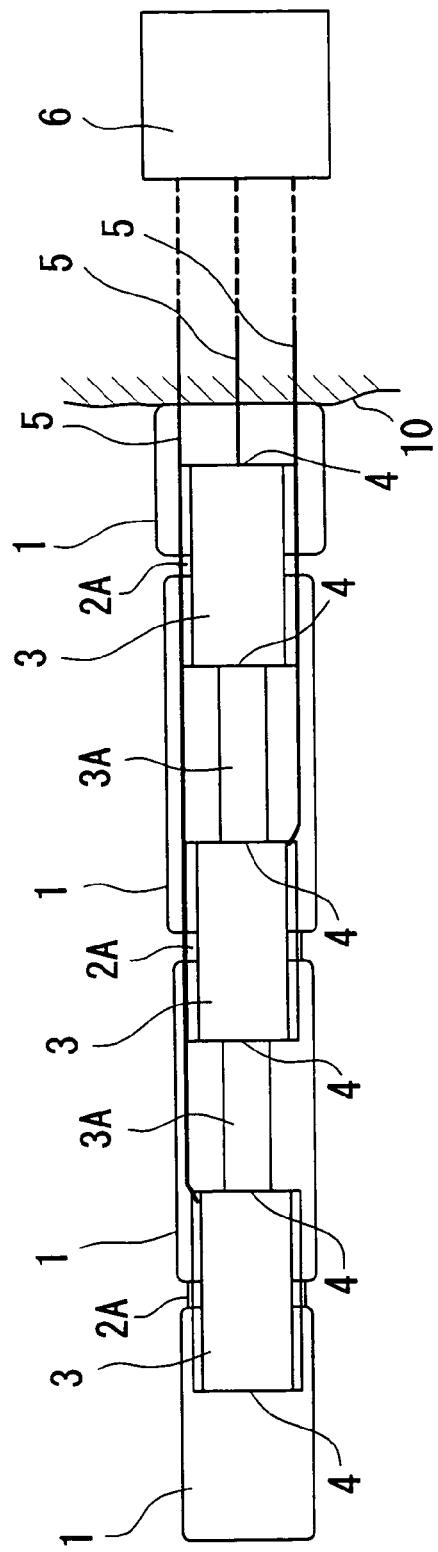
FIG. 2A is a plan view of a planar-type joint drive mechanism in a second embodiment of the present invention.
FIG. 2B is a sectional view of the joint drive mechanism of the second embodiment.
Figure 3A:
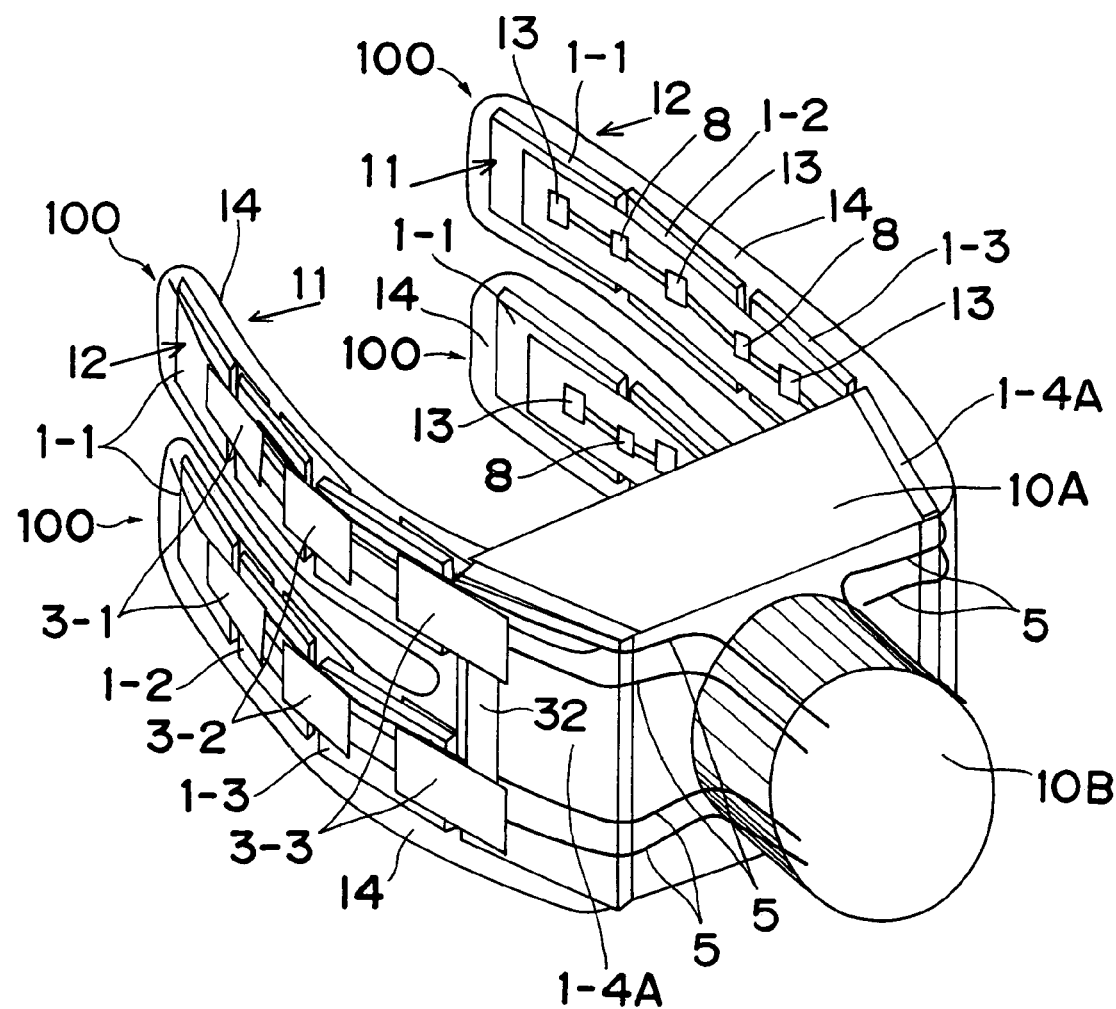
FIG. 3A is a perspective view of a 4-finger type grasping hand in the second embodiment of the present invention.

FIGS. 2A and 2B are a plan view and a sectional view, respectively, of a planar-type joint drive mechanism in a second embodiment of the present invention. The planar-type joint drive mechanism is one in which the joint drive mechanism 100 described in the first embodiment is additionally provided with a sensing function. FIGS. 2A and 2B represent only one array of the joint drive mechanism 100 composed of arrayed bone members 1-1, 1-2, 1-3, 1-4, but the joint drive mechanism 100 may be provided in two arrays like FIG. 1, and otherwise may be provided in multiple arrays. Further, FIGS. 2C and 2D show states in which the individual joint drive mechanisms 100 are deformed by expanding or contracting the elastically expanding/contracting members 3-1, 3-2, 3-3. Furthermore, FIGS. 3A and 3B represent perspective views of grasping hands using this planar-type joint drive mechanism 100 in quantities of four and six, respectively. The elastically expanding/contracting members 3-1, 3-2, 3-3 are provided on the outer side faces of the grasping hands, while the coupling members 2 are positioned on the grasping face sides of the hands.

Referring to FIGS. 2A to 2D, as the coupling portions 2A, . . . , 2A of the bone members 1-1, 1-2, 1-3, 1-4 are largely bent by being driven, a flexible wiring board 7 which is equipped with signal lines for connection of sensors such as deformation amount sensors 8, . . . , 8 of the respective coupling portions 2A, connection lines such as drive lines for electrically driving the elastically expanding/contracting members 3-1, 3-2, 3-3 is disposed adjoining to the coupling portions 2A, . . . , 2A. On the flexible wiring board 7 are provided the deformation amount sensors 8, . . . , 8 for detecting deformation amounts of the individual coupling portions 2A, . . . , 2A as well as touch sensors or tag information detection antennas 9, . . . , 9 such as pressure-sensitive sensors, shearing force sensors, or friction sensors, for detecting the working force, i.e. grasping force, derived from the grasping hand directed to a grasping object. These members are electrically connected to the control section 6A or the like by a connection line 7A.

In this case, since the tag information detection antennas 9 can detect or record various types of information related to a grasping object from a tag attached to the grasping object. In particular, by providing the antennas on the contact surface side of the joint drive mechanism portion that corresponds to the finger and that approaches most to the grasping object in grasping operation, it becomes possible to detect the tag information at a position close to the grasping object, so that its detection precision can be enhanced. Information for determination of control in the grasping for reliable fulfillment of the grasping is detected, the information being such as configuration, weight, softness, or fragility of the grasping object and moreover proper grasping force therefor and which site to perform the grasping as preferable detection information, and then the grasping operation is performed. Further, information as to results of performing the grasping operation, such as a weight change of a remainder of a drink bottle, a position or posture after a move, and a success or failure of grasping, which are items of information for controlling the re-grasping of the same grasping object, can be recorded.

With the above constitution, while information as to the grasping force by the grasping hand against the grasping object is detected by the touch sensors or tag information detection antennas 9, . . . , 9, air pressure control is performed by the control section 6A to control the drive of the actuators 3-1, 3-2, 3-3 so that flexural operation at each joint is controlled. As a result of this, when the grasping object starts to be grasped by the grasping hand, i.e., when the multi-joint drive mechanisms 100 start to make contact with the grasping object, deformation amounts at the respective coupling portions 2A, 2A detected by the deformation amount sensors 8, . . . , 8 are inputted to the control section 6A, and the drive of the actuators 3-1, 3-2, 3-3 by the control section 6A is further controlled based on the deformation amounts of the individual coupling portions 2A, . . . , 2A as well as on the grasping force information derived from the touch sensors or tag information detection antennas 9, . . . , 9 so that flexural operations at the individual joints are further controlled, by which the grasping operation of the grasping object is fulfilled more reliably. Thus, a possibility that excessive grasping force may be exerted on the grasping object by the grasping hand and cause damage of the grasping object, or a possibility of insufficient grasping due to lack of grasping force can be prevented. Conversely, when grasping release operation for the grasping object is performed, the individual multi-joint drive mechanisms 100 are made to separate away from the grasping object by reverse drive of the actuators 3-1, 3-2, 3-3 performed by the control section 6A.

As shown above, by the disposition of the flexible wiring board 7 on a layer close to flexural portions of the coupling portions 2A, . . . , 2A, the flexible wiring board 7 is prevented from being largely warped even if the multi-joint drive mechanisms 100 are driven, thus making it implementable to provide a device having high reliability against iterative operations. In other words, in a state that the sheet-like coupling member 2 is curved, intermediate-layer plane whose strain in the longitudinal direction is zero comes to a center position in its thicknesswise direction according to the strength of materials, where strain increases with increasing distance from the intermediate-layer plane. Therefore, by disposing the flexible wiring board 7 in proximity to the coupling member 2, it is implementable to make up a structure that the flexible wiring board 7 is prevented from being largely distorted.

Also, the joint drive mechanism 100 of the second embodiment has a planar-type structure, which is a structure excellent in process compatibility and suited to multi-layering of the flexible wiring board 7 similarly based on a planar structure. Moreover, since the joint drive mechanism 100, which is planar structured as a whole, can be formed into a small-sized, lightweight device even with a sensing function included. Still also, when the driving-source actuators 3-1, 3-2, 3-3 are driven so as to average pressure signals of pressure-sensitive sensors as an example of the touch sensors correspondingly provided on the respective bone members 1 (1-1, 1-2, 1-3, 1-4) of the multi-joint drive mechanism 100, it becomes possible to grasp grasping objects of various configurations along their configurations, so that the grasping using this grasping hand can be made more flexible in responsivity.

FIGS. 3A and 3B represent perspective views of grasping hands using the joint drive mechanisms 100 of FIGS. 2A and 2B, where the joint drive mechanism 100 is provided in a plural quantity in opposition so as to be given a grasping function. FIG. 3A shows a 4-finger type grasping hand in which two groups each of two fingers each formed from the joint drive mechanism 100 are opposed to each other. FIG. 3B shows a 6-finger type grasping hand in which two groups each of three fingers each formed from the joint drive mechanism 100 similarly are opposed to each other. Referring to FIG. 3B, the 6-finger type grasping hand is so constructed that, as compared with outer-side finger joint mechanisms 100a, 100c each formed from the joint drive mechanism 100, a mid-side finger joint mechanism 100c formed from the joint drive mechanism 100 is larger in joint-to-joint distance so that the joints are shifted in position and increased in length, while the mid-side finger joint mechanism 100c is made longer than the outer-side finger joint mechanisms 100a, 100c so as to be protruded from the outer-side finger joint mechanisms 100a, 100c. As a result of this, it becomes possible to flexibly grasp the grasping object in a wrapping-up manner along its configuration.

Referring to FIG. 3A, the base-end side bone members 1-4 are fixed to a fixing portion 10A of the joint drive mechanism 100 in opposition to each other. The base-end side bone members 1-4 are so provided that one rectangular-plate shaped bone member 1-4A is shared by adjoining two joint drive mechanisms 100, 100. On a grasping face side 11 of the grasping hand are provided touch sensors or tag information detection antennas 13 such as pressure-sensitive sensors, shearing force sensors, or friction sensors, which are connected to the control section 6A or the like, and moreover at its coupling portions 2A are provided displacement sensors 8 which are connected to the control section 6A or the like to detect displacements of the coupling portions 2A, . . . , 2A, respectively. With this constitution, while information as to the grasping force by the grasping hand on the grasping object is detected by the touch sensors or tag information detection antennas 13, . . . , 13, air pressure control is performed by the control section 6A to control the drive of the actuators 3-1, 3-2, 3-3 so that flexural operation at each joint is controlled. As a result of this, when the grasping object starts to be grasped by the grasping hand, i.e., when the multi-joint drive mechanisms 100 start to make contact with the grasping object, deformation amounts at the respective coupling portions 2A, . . . , 2A detected by the deformation amount sensors 8, . . . , 8 are inputted to the control section 6A, and the drive of the actuators 3-1, 3-2, 3-3 by the control section 6A is further controlled based on the deformation amounts of the individual coupling portions 2A, . . . , 2A as well as on the grasping force information derived from the touch sensors or tag information detection antennas 13, . . . , 13 so that flexural operations at the individual joints are further controlled, by which the grasping operation of the grasping object is fulfilled more reliably. Thus, a possibility that excessive grasping force may be exerted on the grasping object by the grasping hand and cause damage of the grasping object, or a possibility of insufficient grasping due to lack of grasping force can be prevented. Conversely, when grasping release operation for the grasping object is performed, the individual multi-joint drive mechanisms 100 are made to separate away from the grasping object by reverse drive of the actuators 3-1, 3-2, 3-3 performed by the control section 6A.

The elastically expanding/contracting members 3-1, 3-2, 3-3 are provided on the outer side face side 12 of the grasping hand, and driven with air pressure applied from the air-pressure introducing passages 5-1, 5-2, 5-3. A grasping face side 11 of the grasping hand is covered with a soft material 14 having a high coefficient of friction, such as rubber, with a view to ensuring a steady grasping of the grasping object, while the outer side face side 12 of the grasping hand is also covered with the soft material 14 for shock-absorption. It is noted that this joint drive mechanism is driven in the grasping direction with air pressure applied, and opened in a direction opposite to the grasping direction by pressure reduction.

This grasping hand is small in size and light in weight by virtue of the use of the above-described joint drive mechanism 100, and moreover high in compliance because of the elastic expanding/contracting members 3 used as a driving source, hence a device which is essentially safe against contact and collisions with persons and highly compatible with persons in combination of those two features. In particular, pneumatic actuators 3, when used as a driving source, show high compliance by virtue of the compressibility of air, thus preferable in this respect. Still also, the driving-source actuators 3-1, 3-2, 3-3 are driven so as to average pressure signals of pressure-sensitive sensors as an example of the touch sensors correspondingly provided on the respective bone members 1 (1-1, 1-2, 1-3, 1-4) of the multi-joint drive mechanism 100, and thus, it becomes possible to grasp grasping objects of various configurations along their configurations, so that the grasping using this grasping hand can be made more flexible in responsivity.

Figure 4A:
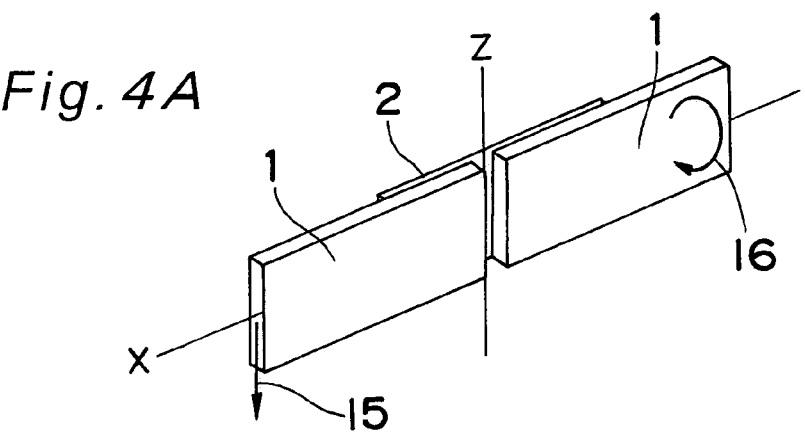
FIG. 4A is a perspective view of an elastic hinge in the second embodiment of the present invention.

FIG. 4A is a perspective view for explaining dynamic properties of a elastic hinge mechanism corresponding to a joint of the multi-joint drive mechanism 100 from which the grasping hand is formed, where adjoining bone members 1, 1 are coupled to each other by a flat spring of the coupling member 2, and the degree of freedom of the coupling portion 2A of the coupling member 2 is restrained only to degree of freedom of one-rotation about a Z axis. Therefore, a force 15 in the Z-axis direction applied to the forward-end side (left side in FIG. 4A) bone member 1 can firmly be sustained with its reaction force given as a moment force 16 about the longitudinal direction (X-axis direction) by the other end portion of the base-end side (right side in FIG. 4A) bone member 1. Still, this property of force, which is effective irrespective of a flexural angle of the coupling portions 2A if the elastic hinge portion has enough high torsional rigidity, does not depend on the force generated by the actuators 3-1, 3-2, 3-3 that serve as a driving source for the joint drive mechanism 100.

Figure 4B:
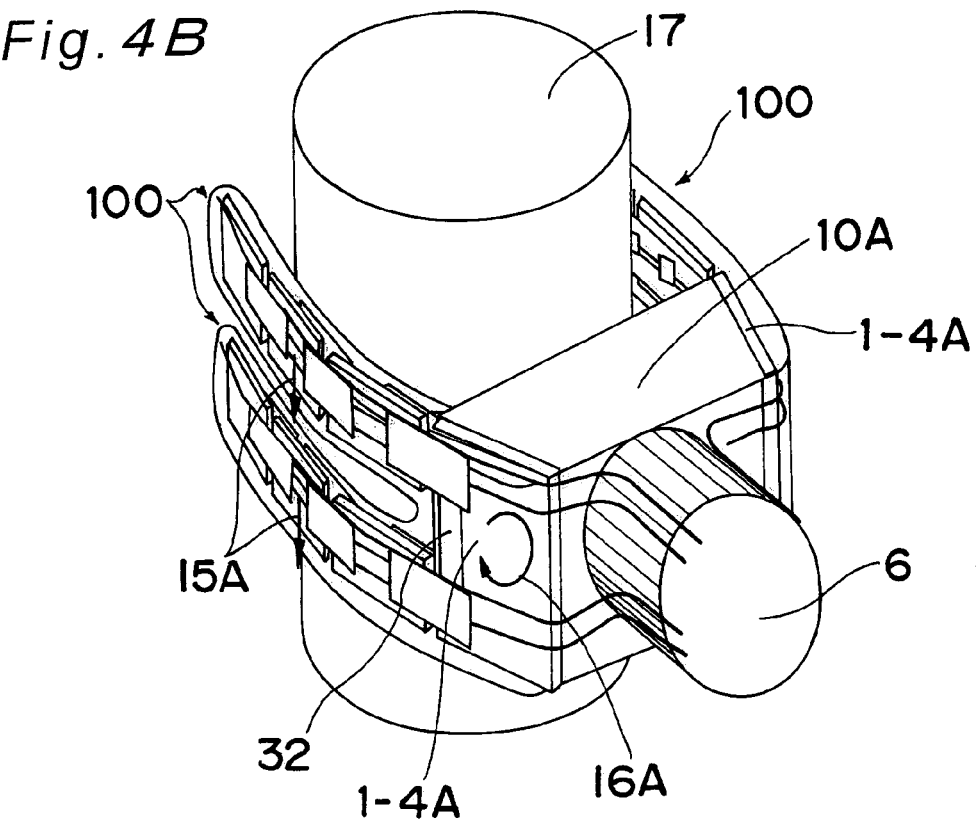
FIG. 4B is a perspective view of the grasping hand showing a grasping state in the second embodiment of the present invention.

FIG. 4B is a perspective view showing a state of grasping a columnar grasping object by the 4-finger type grasping hand explained in FIG. 3A. With the columnar grasping object 17 held by the joint drive mechanisms 100 therebetween, if the frictional force at the gripping surface by that holding force surpasses the gravity of the columnar grasping object 17, this grasping object can be held without being let to fall. In this case, a force 15A applied to the joint drive mechanism 100 can be sustained with its reaction force given as a moment force 16A of FIG. 4A by the base-end bone member 1-4. The property of the moment force 16A is effective irrespective of a flexural angle of the coupling portions 2A, and therefore the grasping operation can be performed flexibly and stably by applying a grasping force in which gravity and frictional force are taken into consideration even if the grasping object 17 varies in size, its diameter in the case of a column. Further, the property of the moment force 16A does not depend on the driving force generated by the actuators 3-1, 3-2, 3-3 that serve as a driving source for the joint drive mechanism 100, and the grasping can be fulfilled only with a stable, minimum grasping force in which the gravity and the frictional force are taken into consideration.

With the pneumatic actuators 3-1, 3-2, 3-3 used, for example, those each having a working cross-sectional area of approximately 1 $cm^2$, applying an air pressure of 1 atmosphere made it possible to hold the columnar grasping object 17 therebetween with a grasping force of approximately 200 g. This grasping hand was able to lift a grasping object 17 of a columnar container filled with water and having a weight of 1 kg.

Figure 4C:
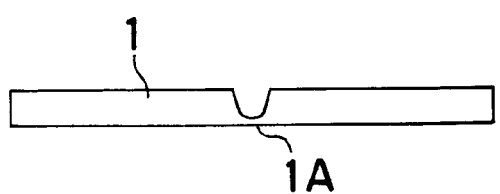
FIG. 4C is a perspective view of a hinge in another mode of the second embodiment of the present invention.
Figure 4D:
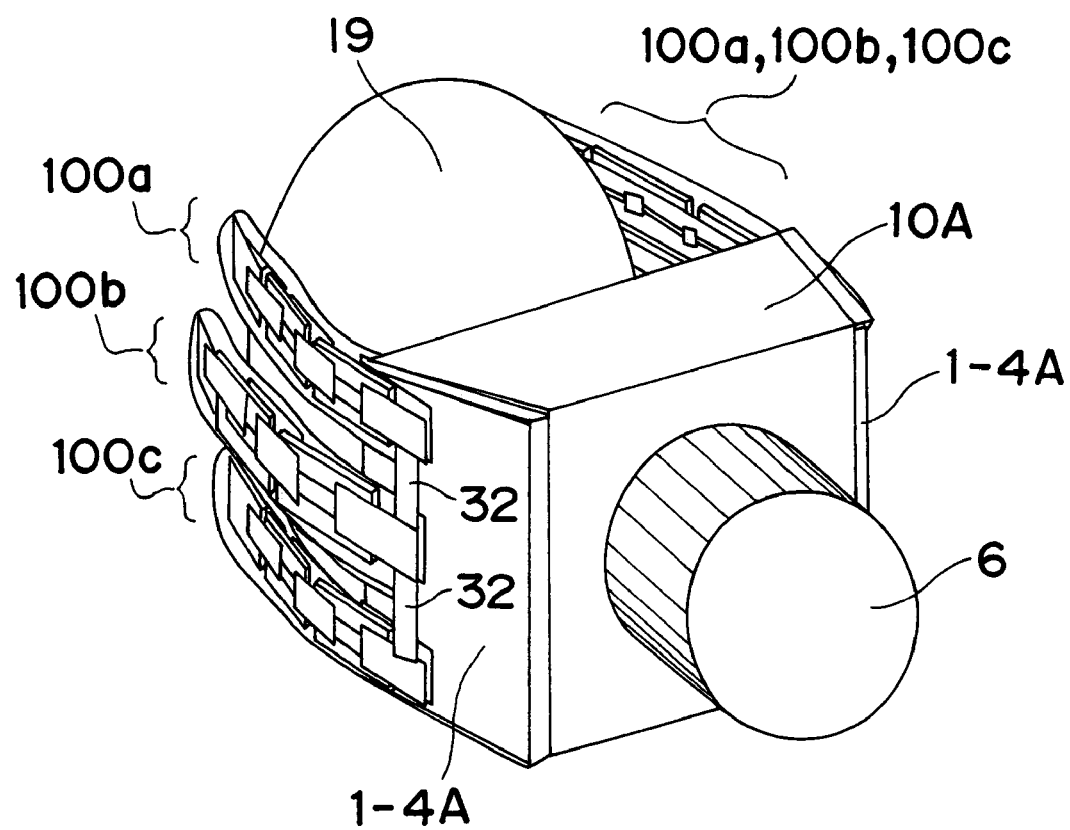
FIG. 4D is a perspective view of a grasping hand showing another grasping state in the second embodiment of the present invention.

FIG. 4D is a perspective view showing a state in which an egg-like grasping object 17 is grasped by the 6-finger type grasping hand shown in FIG. 3B. Referring to FIG. 3B, the 6-finger type grasping hand is so formed that, as compared with the outer-side finger, joint mechanisms 100a, 100c, the mid-side finger joint mechanism 100c is made larger in joint-to-joint distance with the joints shifted in position and protruded by their lengths being varied. As a result of this, it becomes possible to flexibly grasp the grasping object 17 in a wrapping-up manner along the configuration of the grasping object 17. In FIG. 4D, it can be seen that the finger joint mechanisms 100a, 100c, 100c have become deformed in shape to their respective optimum diameters at height-wise places of different diameters of the egg-like grasping object 17, thus flexibly extending along the grasping object 17. By varied distributions of the bone members 1 (1-1, 1-2, 1-3, 1-4) with differences in length, width, joint position, and joint count or of the finger joint mechanisms with differences in length and direction, and the like, it becomes possible to provide a grasping hand which becomes deformed flexibly along an object so as to be able to grasp the object irrespective of the configuration of the grasping object 17.

Here is explained a case where a columnar grasping object 20 with a flange 20A attached thereto is grasped by the grasping hands described in FIGS. 3A and 3B.

Figure 9A:
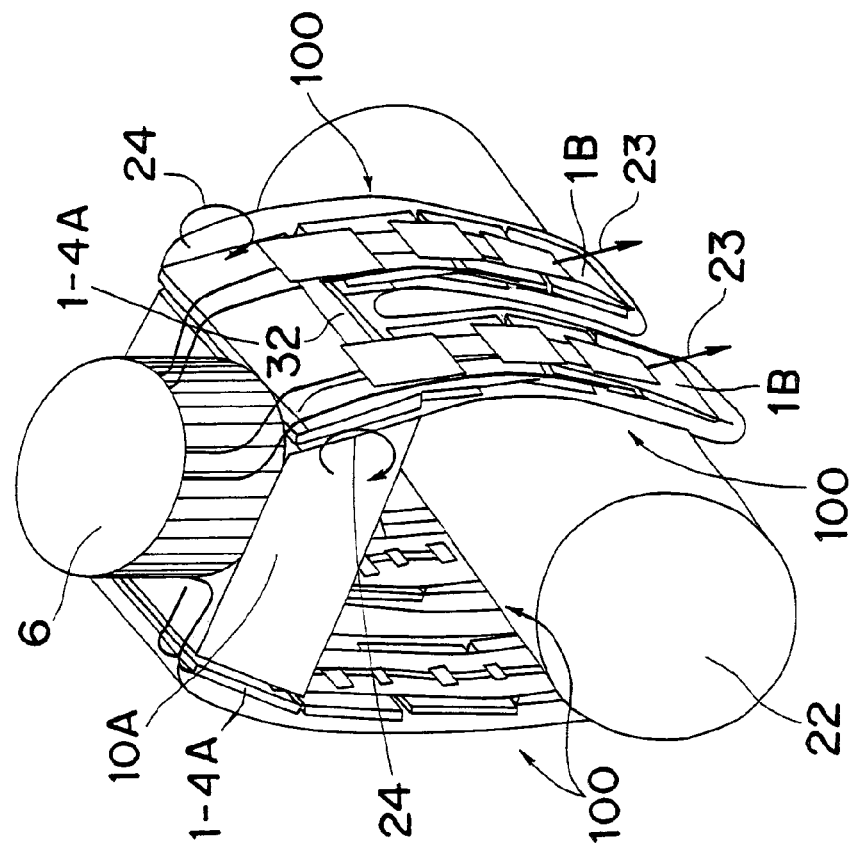
FIG. 9A is a perspective view of the grasping hand showing a grasping state in the second embodiment of the present invention.

FIG. 9A is a perspective view showing a state in which the columnar grasping object 20 with a disc-shaped flange 20A attached is grasped by the grasping hands described in FIGS. 3A and 3B. In this figure, it is shown that the columnar grasping object 20 with the flange 20A attached is held by the joint drive mechanisms 100 therebetween. In this case, as shown in FIG. 9A, forces 15B, 15B applied to the joint drive mechanisms 100, 100 on both sides of the grasping object 20, respectively, can be borne by the base-end bone members 1-4A, 1-4A as moment forces 16B, 16B of their reaction-forces. In this case, since the underside of the flange 20A is, so to speak, mounted on tops of the arrays of the mutually opposing joint drive mechanisms 100, 100, respectively, the holding force has only to be a minimum grasping force that allows the grasping object 20 to be maintained in posture without the need for generating a frictional force that surpasses the gravity of the grasping object 20. This is due to the property of the moment forces 16B, 16B.

Furthermore, in FIG. 9A, a case where the columnar grasping object 20 with the flange 20A attached on top is grasped has been described. However, with the use of the grasping hand in which a plurality of arrays of the multi-joint drive mechanisms 100 are provided in opposition to each other, in the case of grasping a grasping object having a downwardly narrowed configuration, such as of wineglasses, teacups, or other containers, the grasping object comes, at these portions, to be somewhat mounted on tops of some of the arrays of joint drive mechanisms as described above. This makes it possible to grasp various grasping objects flexibly and yet with a minimum grasping force.

Figure 9B:
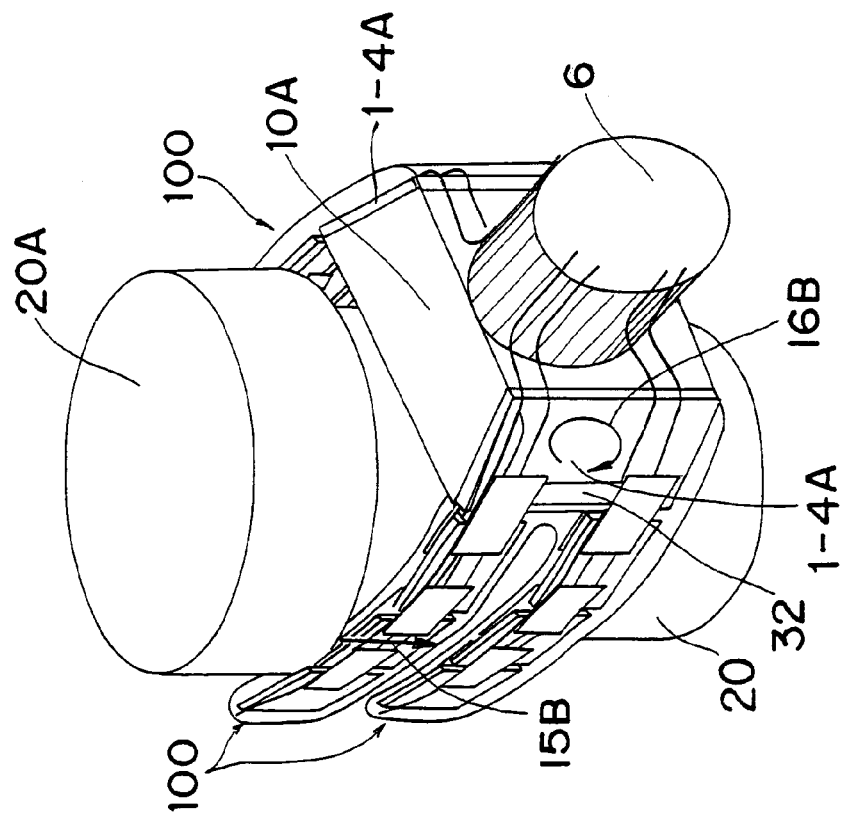
FIG. 9B is a perspective view of the grasping hand showing a grasping state in the second embodiment of the present invention.

FIG. 9B is a perspective view showing a state in which a columnar grasping object 22 in a laterally laid posture (i.e., a posture with its longitudinal direction lateral) is grasped by the grasping hands described in FIGS. 3A and 3B. For grasping of the columnar grasping object 22, flexing forward end portions 1B, . . . , 1B of four multi-joint drive mechanisms 100, . . . , 100 to a larger extent makes it possible to grasp the grasping object 22, as if the grasping object 22 were hooked by a claw, with the weight of the grasping object 22 firmly supported. Referring to FIG. 9B, forces 23, . . . , 23 applied to the four multi-joint drive mechanisms 100, . . . , 100 of the grasping hand by the gravity of the grasping object 22 and the frictional force due to grasping are transferred as moment forces at the individual coupling portions 2A of these multi-joint drive mechanisms 100, . . . , 100, and sustained at the base-end bone member 1-4A portion of each multi-joint drive mechanism 100 with the reaction force as a moment force 24. By virtue of a high rigidity of each multi-joint drive mechanism 100 in its array direction, the force applied to the grasping hand due to the grasping can firmly be sustained at the fixing portion 10A of the multi-joint drive mechanism 100.

FIG. 4C shows a hinge structure described in FIG. 4A, i.e., another mode of the coupling portion, where the bone member 1 is partly constricted to provide a hinge 1A formed of the bone member itself. In this case, since no other coupling member is required, the structure is simple, and moreover since the bone-member layer member 101 is preparatorily integrated, the structure is suitable for integration of other layer members. In the case of FIG. 4C also, as shown by FIG. 4A, the degree of freedom of the coupling portion, i.e., the hinge 1A is restrained to one degree of freedom. Therefore, a force 15 in the Z-axis direction applied to each forward-end side bone member 1 (a bone member 1 corresponding to the left side in FIG. 4A) can firmly be sustained with its reaction force given as a moment force 16 at the other end portion of the base-end side bone member 1 (a bone member 1 corresponding to the right side in FIG. 4A). For formation of such a hinge formed of the bone member itself, polypropylene is suitable as its material. Polypropylene causes less deterioration of strength against large repeated deformation at the hinge portion. In this case, unlike the case in which the hinge is given by the flat spring described in the first embodiment or second embodiment, elastic restoring force is not involved at this hinge portion. Whereas the force generated by the actuators 3-1, 3-2, 3-3 damps in response to an electric deformation amount given that an elastic restoring force is generated, there is a merit that no decrease of the generated force is involved in the hinge of this type.

Figure 10:
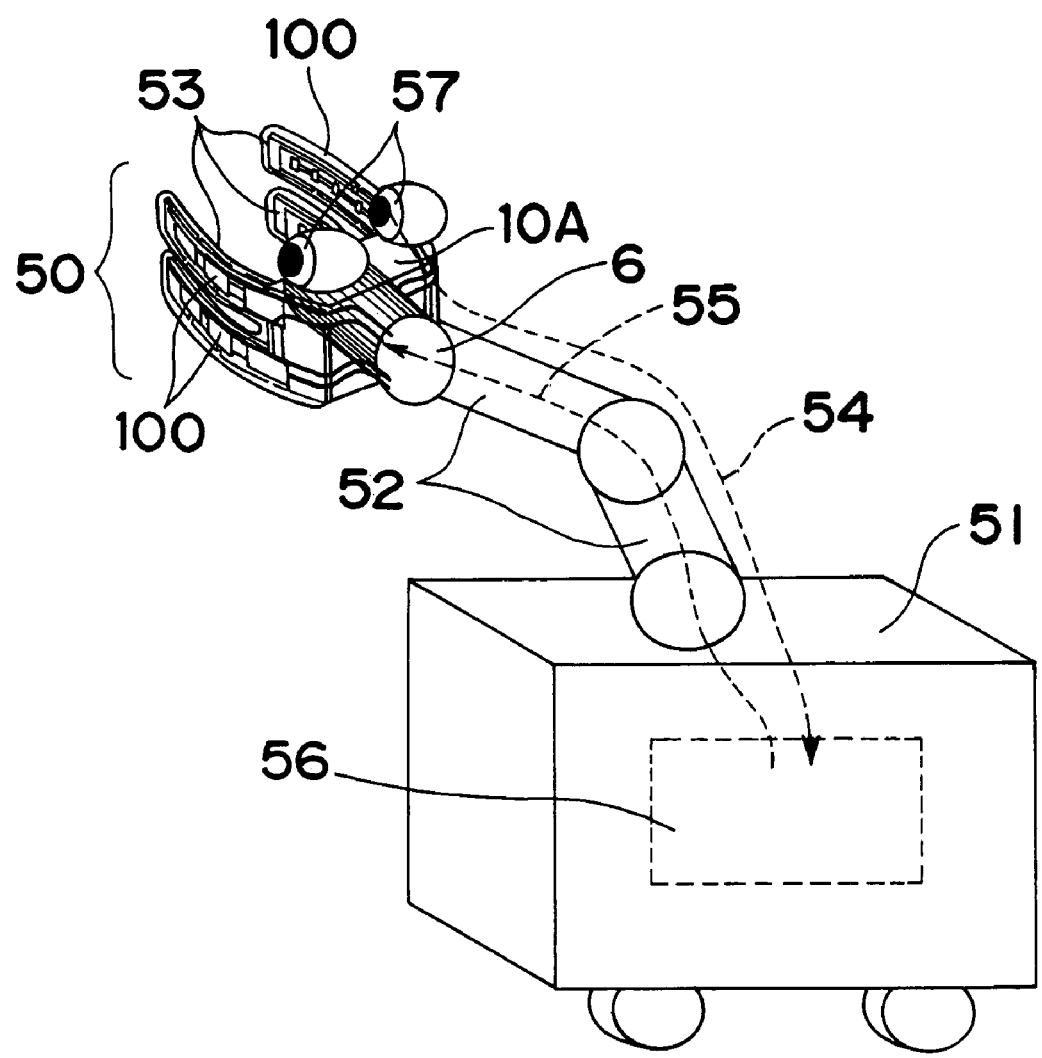
FIG. 10 is a perspective view of a robot having the grasping hand in the second embodiment of the present invention.

Next, a perspective view of a robot equipped with the grasping hand described in the second embodiment is shown in FIG. 10. The grasping hand 50 is coupled to and driven by a moving wagon 51 serving as a robot main unit via two arms 52, 52. The moving wagon 51 can be moved and positioned to an arbitrary position under the control by a control section 56 accommodated inside the moving wagon 51. Each of the arms 52 are rotatably supported at their both end portions, where the lower arm 52 rotates relative to the moving wagon 51 while the upper arm 52 rotates relative to the lower arm 52, by motor drive under the condition of the control section 56, thus allowing the grasping hand 50 to be moved to any arbitrary position. The robot including the grasping hand 50 described in the second embodiment is provided, on the grasping face side of the grasping hand 50, with sensors 53, 53 such as touch sensors such as pressure-sensitive sensors or friction sensors, or displacement sensors of the individual coupling portions 2A, or tag information detection antennas. Therefore, in the robot using this grasping hand 50, the control section 56 that has received signals 54 of those sensors 53, 53 generated along with the grasping operation on the grasping object is enabled based on these signals 54 to drive the arms 52 and the grasping hand 50 by using signals 55 for controlling the grasping operation. For example, the driving-source actuators 3-1, 3-2, 3-3 are driven under the control by the control section 6A to which operation control start signals for the grasping hand 50 have been inputted from the control section 56 so as to average pressure signals of the pressure-sensitive sensors 53, 53 correspondingly provided on the respective bone members 1 of the multi-joint drive mechanisms 100 of the grasping hand 50, and thus, it becomes possible to grasp grasping objects of various configurations along their configurations, so that the grasping using this grasping hand 50 can be made more flexible in responsivity.

Further, in the robot using the grasping hand 50 equipped with a pair of grasping-object information detection devices 57 such as ultrasonic type or image pick-up type or other grasping object detection sensors or cameras or tag information detection antennas or other sensors at the fixing portion 10A of the grasping hand as shown in FIG. 10, it is implementable to control the grasping hand 50 by planning a grasping operation based on grasping-object information detection signals derived from the grasping-object information detection device 57 such as the sensors or cameras or antennas and moreover generating a motional locus of the arms 52 or the grasping hand 50 related to the grasping operation. In this case, combinatorially using signals obtained from the displacement sensors of the described-above coupling portions makes it possible to perform grasping control under the detection of a posture of the grasping hand as well as a more precision obtaining of a position relative to the grasping object.

THIRD EMBODIMENT

FIGS. 5A, 5B, and 5C show drive mechanisms in which a rotational degree of freedom of two or three axes is implemented in a planar fashion by an elastic hinge structure using a flat spring. Coupling portions of the bone members 1, each of which is formed into such a shape as to become a butting portion 1B whose width gradually decreases, are coupled together by a flat spring 30 made of rubber having a proper rigidity. This structure provides a universal joint mechanism capable of rotating about the X, Y, and Z axes. When a material having sufficiently large rigidity of the flat spring 30 is selected, the in-plane rigidity of the flat spring 30 is larger than its flexural rigidity and torsional rigidity, and thus, it is also possible to restrain the degree of freedom for rotation about the Z axis. As shown in FIGS. 5B and 5C, strip-shaped elongate elastically expanding/contracting members 31 of the same structure as the elastic expanding/contracting members 3 (e.g., pneumatic actuators) are disposed on both sides of the butting portion 1B and on both front and rear sides with both end portions thereof fixed to adjoining bone members 1, 1, where the pneumatic actuators of these four elastically expanding/contracting members 31, . . . , 31 are drivable in free directions by being driven antagonistic to each other.

Figure 6:
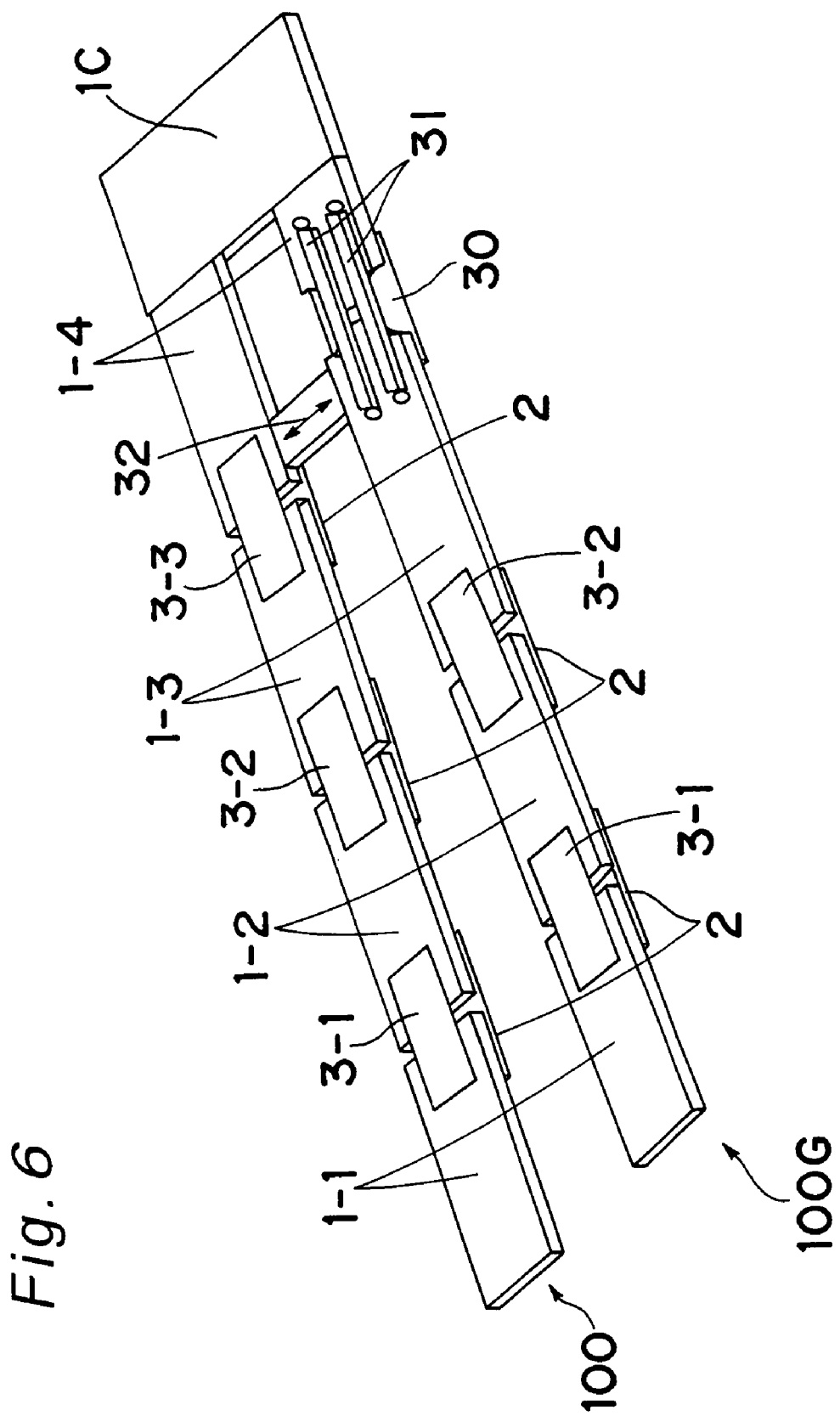
FIG. 6 is a perspective view representing a part of a multi-joint drive mechanism using the multi-axis rotary type elastic hinge in the third embodiment of the present invention.

FIG. 6 is a perspective view representing a part of a planar-type multi-joint drive mechanism 100G in which the universal joint mechanism shown in above-described FIGS. 5A-5C is used instead of the third elastically expanding/contracting member 3-3 of one planar-type multi-joint drive mechanism. Two arrays of bone members are coupled together by a rectangular-plate shaped coupling bone member 1C on the base end side. Using the above universal mechanism at a part of a base-end side portion of the multi-joint drive mechanism 100G constituting a finger allows the finger tip to be moved in every direction, making it achievable to diversify the grasping operation. In order to largely widen the distance between the bone member arrays of the multi-joint drive mechanisms 100, 100G, an elastically expanding/contracting member 32 may be provided at a base end portion between the bone member arrays so that the distance can be efficiently and largely widened by expanding the elastically expanding/contracting member.

In this example, the degree of freedom of at least a coupling portion close to the forward end of the drive section is restrained to one degree of freedom, where the property of the force explained in FIG. 4A in the second embodiment is combinatorially provided, so that the grasping hand using this joint drive mechanism is enabled to firmly sustain the force applied to the hand by the base end portion 1C of its bone members.

FOURTH EMBODIMENT

FIGS. 7A and 7B are a sectional view and a plan view, respectively, representing a multi-joint drive mechanism 100H in a fourth embodiment of the present invention. FIGS. 8A and 8B are a sectional view and a plan view, respectively, representing an antagonistic-drive type multi-joint drive mechanism 100H also in the fourth embodiment. The multi-joint drive mechanisms 100H in either case are driven by shape memory alloy.

The fourth embodiment is an embodiment for cases where the elastically expanding/contracting members are provided on their contact surface side against the grasping object and where the elastically expanding/contracting members are provided on the noncontact surface side opposite to the contact surface side.

Also, later-described McKibbin type pneumatic actuators or electrically drivable electro-active polymers may preferably be applied as actuators.

Referring to FIGS. 7A and 7B, with a plurality of flat-plate bone members 1 coupled together by a flexible wiring board 40, elastic hinges 40A are made up by making use of elasticity of the flexible wiring board 40. On the flexible wiring board 40 are provided displacement sensors 42 for the elastic hinges 40A as well as touch sensors 46 therefor, both of which are connected by connecting lines 41, thus providing functions of detecting posture and tactile sense of this joint drive mechanism 100H. Over the elastic hinges 40A of the flexible wiring board 40 serving as the coupling-portion, shape-memory-alloy wires or coils 43 (43A, 43B) are fixed to the bone members 1-1, 1-2, 1-3, 1-4 and the fixing portion 10 by fixing portions 4A, . . . , 4A and 4B, . . . , 4B. The shape-memory-alloy wires or coils 43A are fixed to the finger-tip side first bone member 1-1 at the fixing portions 4A, and further fixed to a different third bone member 1-3 through hook portions 44A provided on a different second bone member 1-2. The shape-memory-alloy wires or coils 43B are fixed to the second bone member 1-2, which is the second as counted from the finger tip side, at the fixing portions 4B, and further fixed to a still different fourth bone member 1-4 through hook portions 44B provided on the different third bone member 1-3. Those respective shape-memory-alloy wires (or coils) 43A and 43B are independently heated through conduction by a power supply 45 (45A and 45B), by which the drive mechanism is driven. The shape memory alloy of the shape-memory-alloy wires 43A and 43B is provided by one which has been shape-memory treated so as to shrink with the temperature increased beyond martensite transformation temperature, where the shape memory alloy recovers its original length by radiation cooling with the conduction cut off.

It is noted here that the hook portions 44A and the hook portions 44B are members which serve the role as dynamic fulcrums for transferring forces, which are generated from expansion and contraction of the shape-memory-alloy (SMA) wires or coils 43A, to the bone members 1. These hook portions 44A, 44B are attached to the bone members 1 to make the shape-memory-alloy wires or coils 43A hung therefrom, thus filling the role.

Further, the fixing portions 4A and the fixing portions 4B are members to which the shape-memory-alloy wires or coils 43A are fixed and which serve the role similarly as dynamic fulcrums for transferring forces, which are generated from expansion and contraction of the shape-memory-alloy wires or coils 43A, to the bone members 1. The shape-memory-alloy wires or coils 43A are fixedly hung or wound on stepped pins or the like attached to the bone members 1 as fixing members for the fixing portions 4A and the fixing portions 4B.

The antagonistic-drive type multi-joint drive mechanism of FIGS. 8A and 8B are similar in constituent elements to that of FIGS. 7A and 7B. The multi-joint drive mechanism has shape-memory-alloy wires or coils 43C, 43C, as driving sources, attached on its both sides with the bone-member layer member 101 sandwiched therebetween, where antagonistic actions due to the drive of the two wires or coils make the drive mechanism drivable in a grasping direction and its opposite direction.

Some of pneumatic actuators as an example of the actuators are of the type that the actuator is contracted in its longitudinal direction with air pressure applied.

The McKibbin type actuator as another example of the actuator is formed by covering a rubber tube with a cylindrical mesh, and the actuator is expanded in its diametral direction with air pressure applied, the mesh being pulled up along with the expansion and contracted in the longitudinal direction. When the pneumatic actuator of such a function is used for the driving source, the shape-memory-alloy wires or coils in FIGS. 7A and 7B may be replaced with the pneumatic actuator having that function, thus allowing the similar drive mechanism to be provided.

Further, as another example of the actuator, various types of electro-active polymer materials capable of electrical drive have been researched and developed as artificial muscle actuators. For example, there have been proposed multilayer-structure actuators in which sheet-like dielectric polymer is provided with flexible electrodes, as well as gel electrostriction type, gel ion-drive type, conductive polymer method, or other ones. These actuators, when used as a driving source, can be formed as a drive mechanism of the present invention by a structure according to FIGS. 1A-1D or FIGS. 2A-2D for the expansion type, and by a structure according to FIGS. 7A and 7B for the contraction type. Such artificial muscle actuators, which are composed principally of polymer material, are essentially safe against contact and collisions with persons because of material's own light weight and high compliance in combination. Also, artificial muscle actuators, which are generally high in generated energy density, can be employed as the driving source for the multi-joint drive mechanisms of the present invention, being servable as a remarkably energy-saving type device, compared with conventional-type multi-joint drive mechanisms composed of electromagnetic motors and speed reducers.

In the case where the above-described McKibbin type pneumatic actuator or electrically drivable electro-active polymer is applied as an actuator, since these actuators have a narrow, elongate form such as tube-like, sheet-like, or multi-layered form thereof, there would arise buckling against expansive deformation, making it difficult to use the expansive deformation for actuation. Accordingly, these actuators for the most part are preferably made to act in a tensile state due to contractive deformation. The fourth embodiment is a structure suited to making such an actuator act in a tensile state by contractive deformation.

Furthermore, it is also possible to combinatorially provide a structure according to the FIGS. 7A and 7B in addition to the structure of FIGS. 2A-2D on the outer side-face side of the grasping hand, where the joint drive mechanism can be driven by antagonistic actions of both expansion-type and contraction-type elastically expanding/contracting members. In this case, the grasping hand to which this joint drive mechanism is applied can be driven also in a direction of making the grasping object separate away in addition to the function of driving in the grasping direction, thus allowing the distance between joint drive mechanism arrays provided in opposition for grasping to be largely widened. Further, by the structure in which the driving actuators are provided only on the outer side-face side of the grasping hand in such a manner, it becomes implementable to intensively provide displacement sensors of the coupling portions for detection of posture of the joint drive mechanisms, touch sensors for control of the grasping force, and moreover tag information detection antennas for detection of information as to the grasping object, on the grasping surface side, thus advantageous for integration of many distributed sensors. Further, since the grasping surface side of the grasping hand necessarily needs to be brought closer to or into contact with the grasping object along with the grasping, it is advantageous that these sensors are provided on the grasping surface side. Various types of information, such as the configuration, grasping position, grasping plan, and the like relating to the grasping object written in the tag affixed on the grasping object can be detected with high sensitivity at close positions.

FIFTH EMBODIMENT

FIGS. 11A and 11B show a sectional view and a plan view representing a multi-joint drive mechanism in the fifth embodiment of the present invention. In the fifth embodiment, the pneumatic piping in the multi-joint drive mechanism described in the first embodiment is provided as a multilayer-type pneumatic piping layer member 60. With such a structure, since the layer of the bone-member layer member 101 composed of the bone members 1 and the layer composed of the multilayer-type pneumatic piping layer 60 and the elastically expanding/contracting members 3-1, 3-2, 3-3 are separated from each other, it becomes possible to form these members collectively. The rest of the members are similar to those described in the first embodiment.

Next, FIGS. 12A, 12B, and 12C are block diagrams showing a manufacturing method of the multi-joint drive mechanism of this embodiment of the present invention. This manufacturing method includes: a first process of FIG. 12A for collectively forming the bone-member layer member 101 which is disposed in a generally planar fashion with the bone members 1 including their hinge portions 1A; a second process of FIG. 12B for forming the elastic expanding/contracting layer member 103 composed of the elastically expanding/contracting members 3-1, 3-2, 3-3, their coupling portions 3A, and the air-pressure introducing passages 5-1, 5-2, 5-3; and a third process of FIG. 12C for coupling the elastic expanding/contracting layer member 103 to adjoining surfaces of the bone-member layer member 101. By the first process of FIG. 12A, for example, polypropylene, polyethylene, polyethylene terephthalate, or other polymers; or their foams or the like can be collectively formed by means of injection (injection molding) or the like so that the hinge portions 1A come to a constricted structure. Further, the hinge portions 1A can be formed by locally heating plate-shaped members forming the bone members 1. By the second process of FIG. 12B, in the case where the elastically expanding/contracting member is a rubber pneumatic type one that is driven by air pressure, a structure in which elastic members formed of neoprene or silicon or compositions of these materials with fiber are preliminarily coupled together by polyurethane tubes serving as pneumatic piping is temporarily formed with a metal mold, and then finally formed by vulcanization and heating or the like. Further, this structure is coupled to an adjoining surface of the bone-member layer member 101. Coupling therefor is carried out by fitting, press fit, or adhesion into the recessed portions 1a formed in the bone members 1, respectively.

Next, FIGS. 13A, 13B, 13C, and 13D are block diagrams showing another manufacturing method of the multi-joint drive mechanism of this embodiment of the present invention. In this manufacturing method, as a first step of FIGS. 13A and 13B, the individual bone members 1 made of polyethylene foams are stacked and bonded in a generally planar fashion onto polyethylene terephthalate flat springs A, which constitute the coupling member 2, with the coupling portions 2A of the coupling member 2 serving as coupling portions therefor. These bone member arrays may also be provided by collectively stacking and bonding preliminarily coupled ones and thereafter cutting them off. Next, as a second step of FIG. 13C, on these bone members 1 is stacked a three-layer structure made of low-in-elastic-modulus soft silicone rubber as multilayer-type pneumatic piping layer members 60 (such as 60a, 60b, 60c). More specifically, a ground layer 60a is first formed, and then on the ground layer 60a are formed an intermediate layer 60b having space portions in which air introducing passages 5 (5-1, 5-2, 5-3) are formed, and further on the intermediate layer 60b is formed an upper layer 60c having connection holes to the pneumatic actuators. The formation of these three layers can be fulfilled by printing or coating and heat hardening. Finally, as a third step of FIG. 13D is bonded and stacked a structure to which are coupled pneumatic actuators that are elastically expanding/contracting members 3 (3-1, 3-2, 3-3). Since the individual layers can be formed collectively, the manufacture is facilitated irrespective of the degree-of-freedom number of joints, so that the multi-joint drive mechanism can be manufactured with low cost.

As shown above, according to the present invention, there can be provided the multi-joint drive mechanism including the bone-member layer member formed of the plurality of bone members arranged in arrays, the plurality of bone members being movably coupled at the coupling portions, and the elastically expanding/contracting members which are arranged so as to stretch over the coupling portions on the contact-surface side of the bone-member layer member that makes contact with an object and/or on its noncontact-surface side opposed to the contact-surface side and moreover which are fixed between the plurality of bone members.

Also, there can be provided the grasping hand which has the plurality of finger mechanisms formed from the multi-joint drive mechanisms in opposition to one another, where the elastically expanding/contracting members are expanded or contracted so that the finger mechanisms are driven to perform a grasping operation of a grasping object.

Also, there can be provided the robot which includes the grasping hand including a plurality of the multi-joint drive mechanisms, the grasping hand having the touch sensors such as pressure-sensitive sensors or friction sensors or displacement sensors for the coupling members, where grasping operation of the grasping hand is controlled based on information detected by the sensors or antennas.

As a result, there can be realized the grasping hand which itself is small-sized, lightweight, soft, and safe so as to have a capability of dexterously grasping various objects, so that the multi-joint drive mechanism having the concrete construction of practical level including manufacturing facility can be provided as the drive mechanism for the grasping hand. Consequently, the grasping hand becomes suitable as those of robots that are expected to play an active part in household chore support or work support in home or office, hospitals and the like, as well as in care support for the aged or the physically impaired and the like.

Furthermore, since, at least, the multi-joint drive mechanism can be manufactured by collectively forming the bone-member layer member in which the plurality of bone members are arranged in a generally planar fashion and by coupling the elastically-expanding/contracting-member layer member, with which the plurality of elastically expanding/contracting members are integrated, with an adjoining surface of the bone-member layer member on the contact-surface side of the bone-member layer member that makes contact with an object and/or on its noncontact-surface side opposed to the contact-surface side, it becomes implementable to collectively form the individual layers, thus making it implementable to manufacture the multi-joint drive mechanism with manufacturing facility and low cost irrespective of the degree-of-freedom number of joints.

By properly combining the arbitrary embodiments of the aforementioned various embodiments, the effects possessed by the embodiments can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A multi-joint drive mechanism comprising:
a flat-plate bone-member layer member in which a plurality of flat plate bone members are arranged in arrays, each of the flat plate bone members having at least one recessed portion, the plurality of bone members being movably coupled at coupling portions, the coupling portions comprising flat plates; and
elastic members which are arranged so as to stretch over the coupling portions on at least one of a contact-surface side of the bone-member layer member that is to make contact with an object and a noncontact-surface side of the bone-member layer member opposed to the contact-surface side, the elastic members being fitted into the recessed portions of adjacent ones of the bone members so as to be fixed to the adjacent ones of the bone members, the elastic members being capable of being elastically expanded and contracted,
wherein the multi-joint drive mechanism is operable to drive flexural motions with the coupling portions between adjoining bone members serving as joints by expanding or contracting the elastic members, and the multi-joint drive mechanism has a layer structure in which at least the flat-plate bone-member layer member and the elastic members are arranged in a planar fashion.

2. The multi-joint drive mechanism as claimed in claim 1, wherein a degree of freedom of the coupling portions is given generally only by a degree of rotational freedom and the degree of freedom of the coupling portions at least of proximities of their forward ends is restrained to one degree of freedom about an axis generally perpendicular to a direction of the arrays of the bone-member layer member.

3. The multi-joint drive mechanism as claimed in claim 2, wherein the coupling portions are constructed by hinges each formed of a flat spring.

4. The multi-joint drive mechanism as claimed in claim 2, wherein the coupling portions are hinges formed of the bone members themselves by constricting a part of the bone members.

5. The multi-joint drive mechanism as claimed in claim 1, wherein a flexible wiring board having signal lines for connection of deformation sensors for detecting a deformation amount of the coupling portions, and drive lines for electrically driving the elastic members is disposed in proximities to flexural portions of the coupling portions.

6. The multi-joint drive mechanism as claimed in claim 5, wherein the flexible wiring board serves also as hinges each formed of a flat spring.

7. The multi-joint drive mechanism as claimed in claim 1, further comprising a device for expanding or contracting the elastic members, the device being a device which is driven with air pressure applied to a rubber elastic member or a device which is driven by heating and cooling shape-memory material or a device which is driven with an electric field applied to an electro-active polymer.

8. The multi-joint drive mechanism as claimed in claim 7, wherein the elastic members are each formed of a rubber elastic member, and the device for expanding or contracting the elastic members is a device for performing drive by application of air pressure to the rubber elastic members, the multi-joint drive mechanism further comprising a multilayer-type pneumatic piping layer member having piping for applying air pressure to the rubber elastic members.

9. The multi-joint drive mechanism as claimed in claim 1, wherein the bone-member layer member has the plurality of bone members arranged in arrays and in a generally planar fashion.

10. The multi-joint drive mechanism as claimed in claim 1, further comprising:
   a plurality of drive sources, wherein each of the drive sources is arranged to drive flexural motions of a corresponding one of the elastic members by expanding or contracting the corresponding one of the elastic members.

11. A grasping hand having a plurality of finger mechanisms provided in opposition to each other, each of the finger mechanisms having a multi-joint drive mechanism which includes
   antagonistic action of both types.

12. The grasping hand as claimed in claim 11, wherein the grasping hand is enabled to grasp the object by the plurality of finger mechanisms provided in opposition to each other and has, at least on a grasping surface side of the grasping hand, touch sensors, or displacement sensors for the coupling portions, or tag information detection antennas, wherein grasping operation is controlled based on information detected by the touch sensors, displacement sensors or antennas.

13. The grasping hand as claimed in claim 12, wherein the touch sensors are pressure sensitive sensors or friction sensors.

14. The grasping hand as claimed in claim 11, wherein at least a part of a grasping surface side of the grasping hand is covered with a high-friction soft material.

15. The grasping hand as claimed in claim 14, wherein at least a part of the grasping surface side of the grasping hand is covered with rubber.

16. The grasping hand as claimed in claim 11, wherein the elastic members are provided on an outer side-face side of the grasping hand, the elastic members include both expansion type and contraction type ones so as to drive the grasping operation by information detection device.

17. The grasping hand as claimed in claim 11, wherein the multi-joint drive mechanism further comprises:
   a plurality of drive sources, wherein each of the drive sources is arranged to drive flexural motions of a corresponding one of the elastic members by expanding or contracting the corresponding one of the elastic members.

18. A robot comprising:
   a grasping hand having a plurality of multi-joint drive mechanisms, each of the multi-joint drive mechanisms having
      a flat-plate bone-member layer member in which a plurality of flat plate bone members are arranged in arrays, each of the flat plate bone members having at least one recessed portion, the plurality of bone members being movably coupled at coupling portions, the coupling portions comprising flat plates, and
      elastic members which are arranged so as to stretch over the coupling portions on at least one of a contact-surface side of the bone-member layer member that is to make contact with an object and a noncontact-surface side of the bone-member layer member opposed to the contact-surface side, the elastic members being fitted into the recessed portions of adjacent ones of the bone members so as to be fixed to the adjacent ones of the bone members, the elastic members being capable of being elastically expanded and contracted, wherein each of the multi-joint drive mechanisms is operable to drive flexural motions with the coupling portions between adjoining bone members serving as joints by expanding or contracting the elastic members, and has a layer structure in which at least the flat-plate bone-member layer member and the elastic members are arranged in a planar fashion; and
   a touch sensor, or a displacement sensor for the coupling portions provided on the grasping hand, whereby a grasping operation of the grasping hand is controlled based on information detected by the touch sensor or the displacement sensor.

19. The robot as claimed in claim 18, further comprising a grasping-object information detection device, wherein the grasping-object information detection device is one of an ultrasonic type or image pick-up type or a grasping object detection sensor or camera or a tag information detection antenna, whereby the grasping operation of the grasping hand is planned and controlled based on grasping-object information detected by the grasping-object
   a flat-plate bone-member layer member in which a plurality of flat plate bone members are arranged in arrays, each of the flat plate bone members having at least one recessed portion, the plurality of bone members being movably coupled at coupling portions, the coupling portions comprising flat plates, and
   elastic members which are arranged so as to stretch over the coupling portions on at least one of a contact-surface side of the bone-member layer member that is to make contact with an object and a noncontact-surface side of the bone-member layer member opposed to the contact-surface side, the elastic members being fitted into the recessed portions of adjacent ones of the bone members so as to be fixed to the adjacent ones of the bone members, the elastic members being capable of being elastically expanded and contracted, wherein the multi-joint drive mechanism is operable to drive flexural motions with the coupling portions between adjoining bone members serving as joints by expanding or contracting the elastic members, and the multi-joint drive mechanism has a layer structure in which at least the flat-plate bone-member layer member and the elastic members are arranged in a planar fashion,
   and wherein the grasping hand is operable to perform a grasping operation for the object by expanding or contracting the elastic members to drive the finger mechanisms.

20. The robot as claimed in claim 18, wherein the touch sensor is a pressure-sensitive sensor or a friction sensor.

21. The robot as claimed in claim 18, wherein each of the multi-joint drive mechanisms includes a plurality of drive sources, each of the drive sources being arranged to drive flexural motions of a corresponding one of the elastic members by expanding or contracting the corresponding one of the elastic members.

* * * * *

UNITED STATES PATENT AND TRADEMARK OFFICE
CERTIFICATE OF CORRECTION

PATENT NO.        : 7,654,595 B2                                                            Page 1 of 2
APPLICATION NO.   : 10/518756
DATED             : February 2, 2010
INVENTOR(S)       : Kazuo Yokoyama et al.

It is certified that error appears in the above-identified patent and that said Letters Patent is hereby corrected as shown below:

TITLE PAGE
Item (54), Title, "ARTICULATED DRIVING MECHANISM, METHOD OF MANUFACTURING THE MECHANISM, AND HOLDING HAND AND ROBOT USING THE MECHANISM" should read -- MULTI-JOINT DRIVE MECHANISM AND MANUFACTURING METHOD THEREFOR, AND GRASPING HAND AND ROBOT USING THOSE --.

Column 23
Line 26, Claim 11, "antagonistic action of both types." should read
    -- a flat-plate bone-member layer member in which a plurality of flat plate bone members are arranged in arrays, each of the flat plate bone members having at least one recessed portion, the plurality of bone members being movably coupled at coupling portions, the coupling portions comprising flat plates, and
    elastic members which are arranged so as to stretch over the coupling portions on at least one of a contact-surface side of the bone-member layer member that is to make contact with an object and a noncontact-surface side of the bone-member layer member opposed to the contact-surface side, the elastic members being fitted into the recessed portions of adjacent ones of the bone members so as to be fixed to the adjacent ones of the bone members, the elastic members being capable of being elastically expanded and contracted, wherein the multi-joint drive mechanism is operable to drive flexural motions with the coupling portions between adjoining bone members serving as joints by expanding or contracting the elastic members, and the multi-joint drive mechanism has a layer structure in which at least the flat-plate bone-member layer member and the elastic members are arranged in a planar fashion,
    and wherein the grasping hand is operable to perform a grasping operation for the object by expanding or contracting the elastic members to drive the finger mechanisms. --.

Signed and Sealed this

Twentieth Day of July, 2010

David J. Kappos
*Director of the United States Patent and Trademark Office*

Column 23
Line 48, Claim 16, "information detection device" should read -- antagonistic action of both types. --.

Column 24
Line 29, Claim 19, "by the grasping-object" should read -- by the grasping-object information detection device. --.

Line 30, Claim 19, cancel the text beginning with "a flat-plate" to and ending "finger mechanisms." in column 24, lines 56-57.

UNITED STATES PATENT AND TRADEMARK OFFICE
CERTIFICATE OF CORRECTION

PATENT NO. : 7,654,595 B2
APPLICATION NO. : 10/518756
DATED : February 2, 2010
INVENTOR(S) : Kazuo Yokoyama et al.

It is certified that error appears in the above-identified patent and that said Letters Patent is hereby corrected as shown below:

TITLE PAGE, Item (54) and at Column 1, lines 1-4,
Title, "ARTICULATED DRIVING MECHANISM, METHOD OF MANUFACTURING THE MECHANISM, AND HOLDING HAND AND ROBOT USING THE MECHANISM" should read -- MULTI-JOINT DRIVE MECHANISM AND MANUFACTURING METHOD THEREFOR, AND GRASPING HAND AND ROBOT USING THOSE --.

Column 23
Line 26, Claim 11, "antagonistic action of both types." should read
   -- a flat-plate bone-member layer member in which a plurality of flat plate bone members are arranged in arrays, each of the flat plate bone members having at least one recessed portion, the plurality of bone members being movably coupled at coupling portions, the coupling portions comprising flat plates, and
   elastic members which are arranged so as to stretch over the coupling portions on at least one of a contact-surface side of the bone-member layer member that is to make contact with an object and a noncontact-surface side of the bone-member layer member opposed to the contact-surface side, the elastic members being fitted into the recessed portions of adjacent ones of the bone members so as to be fixed to the adjacent ones of the bone members, the elastic members being capable of being elastically expanded and contracted, wherein the multi-joint drive mechanism is operable to drive flexural motions with the coupling portions between adjoining bone members serving as joints by expanding or contracting the elastic members, and the multi-joint drive mechanism has a layer structure in which at least the flat-plate bone-member layer member and the elastic members are arranged in a planar fashion, This certificate supersedes the Certificate of Correction issued July 20, 2010.

Signed and Sealed this

Seventeenth Day of August, 2010

David J. Kappos
*Director of the United States Patent and Trademark Office* and wherein the grasping hand is operable to perform a grasping operation for the object by expanding or contracting the elastic members to drive the finger mechanisms. --.

Column 23
Line 48, Claim 16, "information detection device" should read -- antagonistic action of both types. --.

Column 24
Line 29, Claim 19, "by the grasping-object" should read -- by the grasping-object information detection device. --.

Line 30, Claim 19, cancel the text beginning with "a flat-plate" to and ending "finger mechanisms." in column 24, lines 56-57.